US009587631B2

(12) United States Patent
Pristash

(10) Patent No.: US 9,587,631 B2
(45) Date of Patent: Mar. 7, 2017

(54) VERTIAL AXIS WIND/SOLAR TURBINE

(71) Applicant: David John Pristash, Brecksville, OH (US)

(72) Inventor: David John Pristash, Brecksville, OH (US)

( * ) Notice: Subject to any disclaimer, the term of this patent is extended or adjusted under 35 U.S.C. 154(b) by 0 days.

(21) Appl. No.: 14/789,058

(22) Filed: Jul. 1, 2015

(65) Prior Publication Data
US 2016/0025067 A1    Jan. 28, 2016

Related U.S. Application Data

(60) Provisional application No. 62/021,279, filed on Jul. 7, 2014.

(51) Int. Cl.
| F03D 9/00 | (2016.01) |
| F03D 3/00 | (2006.01) |
| F03D 3/02 | (2006.01) |
| F03D 3/04 | (2006.01) |
| H02K 7/02 | (2006.01) |
| H02K 7/18 | (2006.01) |

(52) U.S. Cl.
CPC ............ *F03D 9/007* (2013.01); *F03D 3/005* (2013.01); *F03D 3/02* (2013.01); *F03D 3/0427* (2013.01); *F03D 9/002* (2013.01); *H02K 7/025* (2013.01); *H02K 7/183* (2013.01); *Y02E 10/74* (2013.01); *Y02E 60/16* (2013.01); *Y02E 70/30* (2013.01)

(58) Field of Classification Search
CPC ...................................................... F03D 9/007
USPC ........................................................ 290/55
See application file for complete search history.

(56) References Cited

U.S. PATENT DOCUMENTS

| 4,818,180 | A | * | 4/1989 | Liu | ........................... F03D 7/06 416/117 |
| 5,075,564 | A | * | 12/1991 | Hickey | ................... B63H 9/06 290/44 |
| 7,453,167 | B2 | * | 11/2008 | Gilbert | .................... F03D 3/005 290/55 |
| 7,931,440 | B2 | * | 4/2011 | Bobowick | .............. F03D 3/067 415/117 |

(Continued)

FOREIGN PATENT DOCUMENTS

| CN | 102094761 | A | * | 6/2011 |
| CN | 202417835 | U | * | 9/2012 |
| JP | 5594811 | B2 | * | 9/2014 |

*Primary Examiner* — Joseph Waks
(74) *Attorney, Agent, or Firm* — Ingenium Patents LLC; Peter R. Kramer

(57) ABSTRACT

A combined vertical axis wind turbine (VAWT) and vertical axis solar turbine (VAST) is disclosed. The apparatus has a plurality of counter rotating solar/wind collection panels which are mounted on respective counter rotating collars. The orientation of the panels is controlled by servo motors. Torque from the counter rotating collars is combined by a set of gears with the combined torque driving rotation of a power collecting column. Torque from the power collecting column is transmitted to a power transfer column through gears in a gearbox and then to a flywheel which has an armature as part of a motor generator whereby mechanical energy can be converted to electrical energy with the motor generator. Solar energy from the PV panels is routed to a power conditioning unit which is also connected to the motor generator.

9 Claims, 34 Drawing Sheets

(56) References Cited

U.S. PATENT DOCUMENTS

Figure 1:
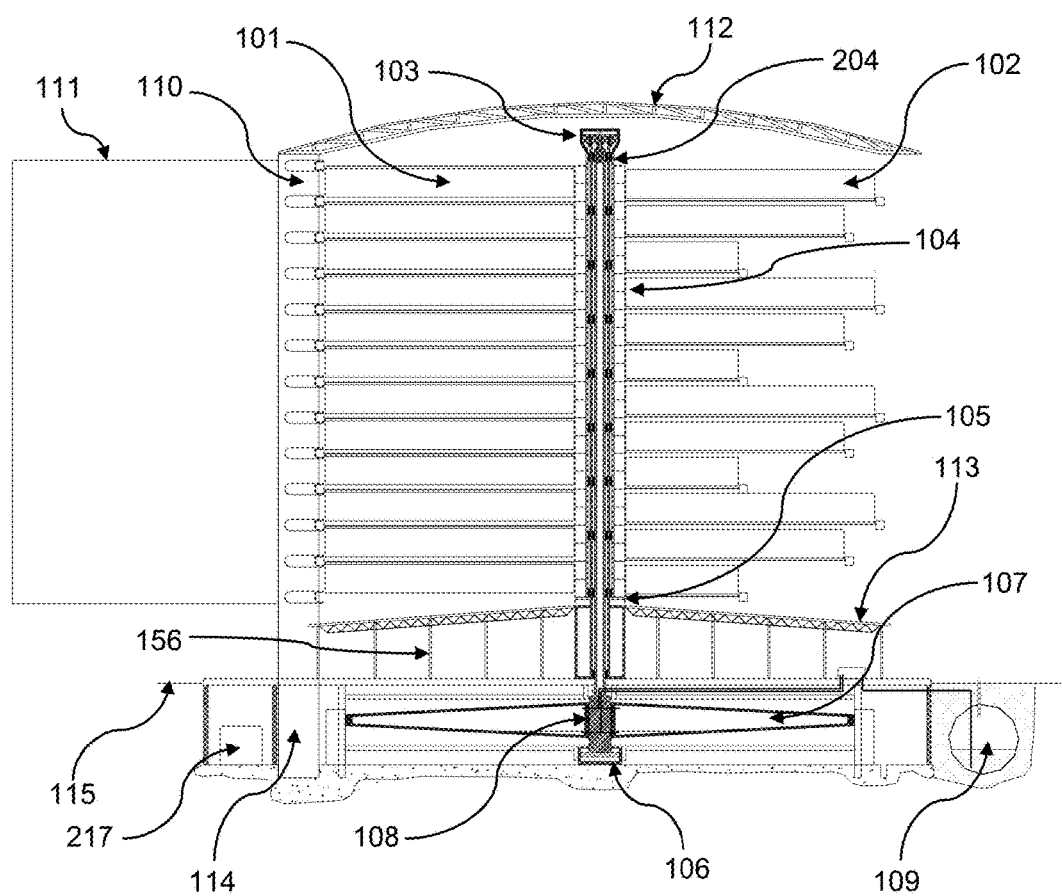

| | | | |
|---|---|---|---|
| 7,963,112 B1* | 6/2011 | Joseph | F03B 13/144 290/42 |
| 8,341,957 B2* | 1/2013 | Joseph | F03B 13/144 290/42 |
| 8,564,147 B1* | 10/2013 | Sharp | F03D 9/007 290/44 |
| 2009/0066088 A1* | 3/2009 | Liang | F03D 3/067 290/55 |
| 2009/0074577 A1* | 3/2009 | Semov | F03D 3/02 416/132 B |
| 2009/0220342 A1* | 9/2009 | Wu | F03D 1/02 416/124 |
| 2010/0013238 A1* | 1/2010 | Jessie | F03D 3/007 290/55 |
| 2010/0233919 A1* | 9/2010 | Ersoy | B63H 9/02 440/8 |
| 2011/0025070 A1* | 2/2011 | Price | F03D 3/005 290/55 |
| 2011/0062717 A1* | 3/2011 | Price, Jr. | F03D 3/005 290/55 |
| 2011/0200436 A1* | 8/2011 | Wu | F03D 3/005 416/170 R |
| 2012/0061972 A1* | 3/2012 | Young | F03D 3/065 290/55 |
| 2012/0074705 A1* | 3/2012 | Stephens | F03D 3/02 290/55 |
| 2012/0121379 A1* | 5/2012 | Chio | F03D 3/005 415/4.2 |
| 2012/0153632 A1* | 6/2012 | Suttisiltum | F03D 3/0427 290/55 |
| 2012/0183407 A1* | 7/2012 | Vallejo | F03D 3/061 416/228 |
| 2012/0235418 A1* | 9/2012 | Plaskove | F03D 3/02 290/55 |
| 2013/0106193 A1* | 5/2013 | Bryson | F03D 9/007 307/73 |
| 2013/0177426 A1* | 7/2013 | Juan Andreu | F03D 3/02 416/204 R |
| 2014/0050583 A1* | 2/2014 | Wang | F03D 3/00 416/98 |
| 2015/0069759 A1* | 3/2015 | Aranovich | F03D 3/005 290/52 |
| 2015/0192107 A1* | 7/2015 | Kirchman | F03D 7/06 416/1 |
| 2015/0322920 A1* | 11/2015 | Jones | F03D 9/003 416/1 |
| 2016/0169197 A1* | 6/2016 | Mak | F03D 1/02 416/186 R |
| 2016/0208774 A1* | 7/2016 | West | F03D 3/005 |

* cited by examiner

VERTIAL AXIS WIND/SOLAR TURBINE

CROSS-REFERENCED TO RELATED APPLICATION

This application claims the benefit of provisional patent application PPA 62,021,279 filed on 2014 Jul. 7 by the present inventor.

FEDERAL SPONSORED RESEARCH

N/A

SEQUENCE LISTING OR PROGRAM

N/A

BACKGROUND AND PRIOR ART

The following is a tabulation of some of the prior art that presently appears relevant:

| U.S. patents | | |
|---|---|---|
| 4,496,283 | Jan. 29, 1988 | Kodric |
| 4,729,716 | Mar. 8, 1988 | Schmidt |
| 4,818,180 | Apr. 4, 1989 | Lin |
| 5,086,664 | Feb. 11, 1992 | Wagner |
| 6,016,015 | Jan. 18, 2000 | Willard |
| U.S. Pat. No. 6,853,096 B1 | Feb. 8, 2005 | Yu |
| U.S. Pat. No. 6,883,399 B2 | Apr. 26, 2005 | Burstall |
| U.S. Pat. No. 6,942,454 B2 | Sep. 13, 2005 | Ohlmann |
| U.S. Pat. No. 7,453,167 B2 | Nov. 18, 2008 | Gilbert |
| U.S. Pat. No. 7,931,440 B2 | Apr. 26, 2011 | Bobowick |
| U.S. Pat. No. 7,963,112 B1 | Jun. 21, 2011 | Joseph |
| U.S. Pat. No. 8,177,481 B2 | May 15, 2012 | Liang |
| U.S. Pat. No. 8,341,957 B2 | Jan. 1, 2013 | Joseph |

| U.S. Patent Pending | | |
|---|---|---|
| US 2008/0047270 A1 | Feb. 28, 2008 | Gilbert |
| US 2009/0035134 A1 | Feb. 5, 2009 | Kuo |
| US 2009/0066088 A1 | Mar. 12, 2009 | Liang |
| US 2009/0220342 A1 | Sep. 3, 2009 | Wu |
| US 2009/0284018 A1 | Nov. 19, 2009 | Ellis |
| US 2010/0143133 A1 | Jun. 10, 1010 | Bobowick |
| US 2011/0175370 A1 | Jul. 21, 2011 | Dugas |
| US 2011/0200436 A1 | Aug. 18, 2011 | Wu |
| US 2012/0121379 A1 | May 17, 2012 | Chio |
| US 2012/0074705 A1 | Mar. 29, 2012 | Stephens |
| US 2012/0061972 A1 | Mar. 15, 2012 | Young |
| US 2013/0177426 A1 | Jul. 11, 2013 | Andreu |
| US 2014/0265598 A1 | Sep. 18, 2014 | Isabella |

FIELD OF THE INVENTION

This VAST relates to a hybrid electrical generation system and advanced storage of said energy; synergizing and combining renewable energy sources, such as wind kinetic energy and solar radiation that can be safely collected efficiently and environmentally and then stored in the VAST for use later.

BACKGROUND OF THE INVENTION

There are three basic wind turbine designs that have been developed which are: the horizontal axis wind turbine HAWT Towered; The vertical axis wind turbine VAWT Savonius; and the vertical axis wind turbine VAWT Darrieus, or "eggbeater." Each of these basic methods has many variations that have been developed over the years. Of these three types of wind turbines only the HAWT types are made in commercial quantities today.

HAWT Towered turbines are the ones most often seen today as they are being installed all over the country and the world. They have the main rotor and normally three blades, a connecting shaft, the gear box and an electrical generator at the top of a tall tower, and must be pointed into the wind by some method as they are not self orienting. The large blades are connected to a gearbox, which turns the slow rotation of the blades into a quicker rotation that is used to drive an electrical generator which could be either AC or DC.

VAWT The vertical axis wind turbine Savonius, which are drag-type devices with two (or more) scoops, are used in common anemometers. If there are at least three scoops they are always self-starting. This design is not generally used for power generation as they have a very low torque output because there is too much counter force from the returning scoops limiting output.

The vertical axis wind turbine VAWT Darrieus or "eggbeater" turbines were named after their French inventor, Georges Darrieus. They have good running efficiency, but produce large torque stress on the tower which can be reduced by using three or more blades which results in greater solidity of the rotor. They also generally require some external power source to start them turning because the wind starting torque of this design is very low. These designs are sometimes seen in private non-commercial installations.

There are two basic methods of collection solar energy for electricity, which are photovoltaic (PV) and concentrated solar power (CSP). Photovoltaic's (PV) convert light directly into electric current by using the photoelectric effect and are the most common as they were first developed about 110 years ago. Since then much progress has been made in the collection efficiency of PV but other than that they are basically the same as when first invented. Almost the entire installed base of solar PV today is of this type.

Concentrated solar power systems (CSP) are newer and use lenses or mirrors and tracking systems to focus a large area of sunlight into a small beam which can be used to produce electricity in a special kind of high temperature PV photo cell or which can be used to heat an object such as water which can be turned to steam to run a conventional turbine generator. Current development is improving the efficiency of these two systems but they are still basically experimental.

Energy storage for any form of renewable energy i.e. wind or solar energy is a key item if grid level power base or peak is desired. There are three forms of storing energy in large amounts, pumping water to a higher elevation, chemical batteries and flywheels. Capacitors and other exotic methods have yet to be shown practical for anything other than small local special situations. Each of these methods has its limitations but to date the pumped storage of water is the only one that has been used in quantities that are commercial.

PRIOR ART

There are numerous patents and patent applications relating to these wind turbines and solar photovoltaic (PV) panel devices, currently more in photovoltaic than wind turbines since the core concepts in wind turbines were developed long before the present time. Virtually all of these newer patent and patent applications are for refinements of the old methods of construction or manufacturing of various aspects of building and using these previously mentioned methods of turning solar and wind energy into useable kinetic or electric energy. The source of all the energy that these devices use is the sun. The sun sends energy that reaches the Earth's surface and by warming creates the winds for the turbines. The sun also sends light and that provides the optical energy for photovoltaic collectors so the sun is the fuel of all green energy devices.

HAWT wind turbine designs are the current prevailing method of collecting energy from the movement of the earth's atmosphere in the form of wind. These designs by their very nature have limitations which make them unsuitable for base load grid level power. The most serious of these issues is their unreliable output defined in the industry as Uptime which is the percentage of a year (24 hours per day for 365 days) in which the device is generating usable power, i.e. a modern coal or nuclear fueled plant will operate at 90% or more uptime. To generate reliable power there must be a constant source of fuel, in this case the wind blowing at a high enough velocity to justify the cost of an installation. The general rule of thumb is that these HAWT systems have an uptime of at best 25% to 30%. Many installed HAWT systems have lower uptimes so this is the most serious of the HAWT wind turbine system flaws.

HAWT wind turbine designs have another major issue and that is an inherent vibration as one of the spinning blades must pass in front of the supporting tower. This sets up a vibration that is difficult to engineer around because it is not a constant since the frequency depends on the RPM of the blades. This problem manifests itself in two forms, one a structural vibration or harmonic, and two an audible pulsing in the air which can cause problems for both people and animals. The vibrations in the HAWT structure have caused major damage to existing wind turbines to include total loss of the installed HAWT device and also shutting them down so people can sleep at night which reduces their usefulness and defeats the purpose of building them.

HAWT wind turbine designs have one other problem which is they are difficult to make and deliver to installation sites because of the size of the turbine blades. In general they are limited today to 2.5 mW on land and 5.0 mW in the oceans. Larger sizes are in development, but even still, they need to be installed in wind farms of hundreds of units to be practical for grid power.

Solar photovoltaic (PV) and solar concentrator designs CSP) are more current then wind turbines but have similar limitations. Although, like wind turbines, much effort has gone into making improvements and great progress has been made. The inherent limitations of a source of a constant supply of light make these systems just as unsuitable for grid level power as conventional wind turbines.

Solar photovoltaic (PV) does need fuel and in this case, it is sun light that reaches the earth's surface. Therefore since the planet rotates every 24 hours the best possible active time for Solar PV is 12 hours per day over the solar year since the panels will only be in the light for that amount of time. The sun also raises, peaks and then sets and, unless the panels can track the sun, this places additional limitations on them such that this reduces the theoretical Uptime to probably less than 30% uptime with the additional problem of cloud cover.

Next, Solar PV panels have very low conversion efficiencies although much progress has been made to improve the low efficiency. Today a conversion efficiency of 25% would be very good. Combining the physical limit of less than 50% of the time there is light with the conversion efficiency of at best 25% and then considering cloud cover that blocks light gives an overall conversion efficiency of less than 10% and therefore very large areas would be needed to generate meaningful levels of power.

Lastly there is one other issue with solar PV that has not been discussed yet and that is tens of thousands of acres of black solar panels will change the albedo of the planet making it hotter completely reversing the desired effect that is being promoted with their use.

Wind turbines and concentrated solar power have one thing in common. They both kill lots of flying animals and insects with either the spinning blades of the wind turbines or with the super high temperature focused light beams from the mirrors and lens of concentrated solar energy. This is the worst flaw here since the energy beams are basically invisible to the flying animals and insects.

Energy storage is one of the more difficult subjects in the field of energy since we use most of our energy in the form of electricity and electricity must be used and generated at the same time. In fact, what makes the grid work is the ability to achieve this almost perfect match of use to generation and do so extremely reliably. Currently only pumped water storage has been used for storage but it only works where there is a nearby higher elevation that is suitable for holding a large body of water; so it is inherently very limited.

Electrical energy storage takes many forms mostly very small scale, in comparison with grid level power that works well for uses such as cell phones and portable computer devices such as tablets. Actual electricity is not stored in batteries, it's converted into a chemical form and then released back to electricity when used. Each of these conversions reduces the efficiency as no conversions are even close to 100%. All of these forms of electrical storage are prohibitively expensive for storage of mW's of power that would be needed for grid power. Further it's unlikely that any chemical battery design could be developed for economically storing mW's of power for the grid barring a major breakthrough, which doesn't seem possible today.

Flywheel systems have been designed that store energy, however all of these designs are very expensive since they use extremely high rotation speeds for energy storage. In that form of using high RPM, it means they would not be suitable for grid level power storage in a device such as used in the VAST system being presented here.

ADVANTAGES

There are three main advantages to the system shown here and designated as a Vertical Axis Solar Turbine or VAST.

The first relates to higher efficiency and uptime:

A. Dual fuel, wind and solar, provides for higher energy of up to 18 time more $kW/m^3$ than either of these two fuel sources alone.

B. The dual fuel concept means there will be a much higher uptime than other designs of up to 60% versus the conventional of 30%.

C. Servo or stepper motor control of the rotating Wind/Solar panels means that the system can be optimized for either wind or solar, depending on the actual conditions at the site at the time.

D. The design used here, with the surrounding support cage and moveable panels (wings), allows for a larger wind collection area, than other designs, which direct wind or light into the VAST.

E. All the heavy operating items i.e. generators, gear boxes, transformers, etc. are located on the ground of the building or in the basement for easier maintenance and construction.
F. The VAST is easily scalable and the components that are used to make the VAST can all be transported by normal means and thereby the VAST is more flexible than other systems.

The second advantage is safety:
A. The vertical axis system, although rotating, presents a solid front to flying animals or insects which will minimize the killing of them.
B. Without any spinning turbine blades, there will be much less noise coming from this system.
C. The addition of moveable panels on the support structure allows for protection of the VAST when needed.

The third is temporary Energy storage:
A. Flywheel energy storage will also help to improve uptime by storing the fuel energy collected with minimum energy conversion.
B. A variable density flywheel, using a fluid, that can be filled with a liquid by pumping it in or pumping it out to give any amount of mass desired.
C. A hydraulic support system that acts as both a bearing and as a lifting method.

DRAWINGS AND FIGURES

Figure 2:
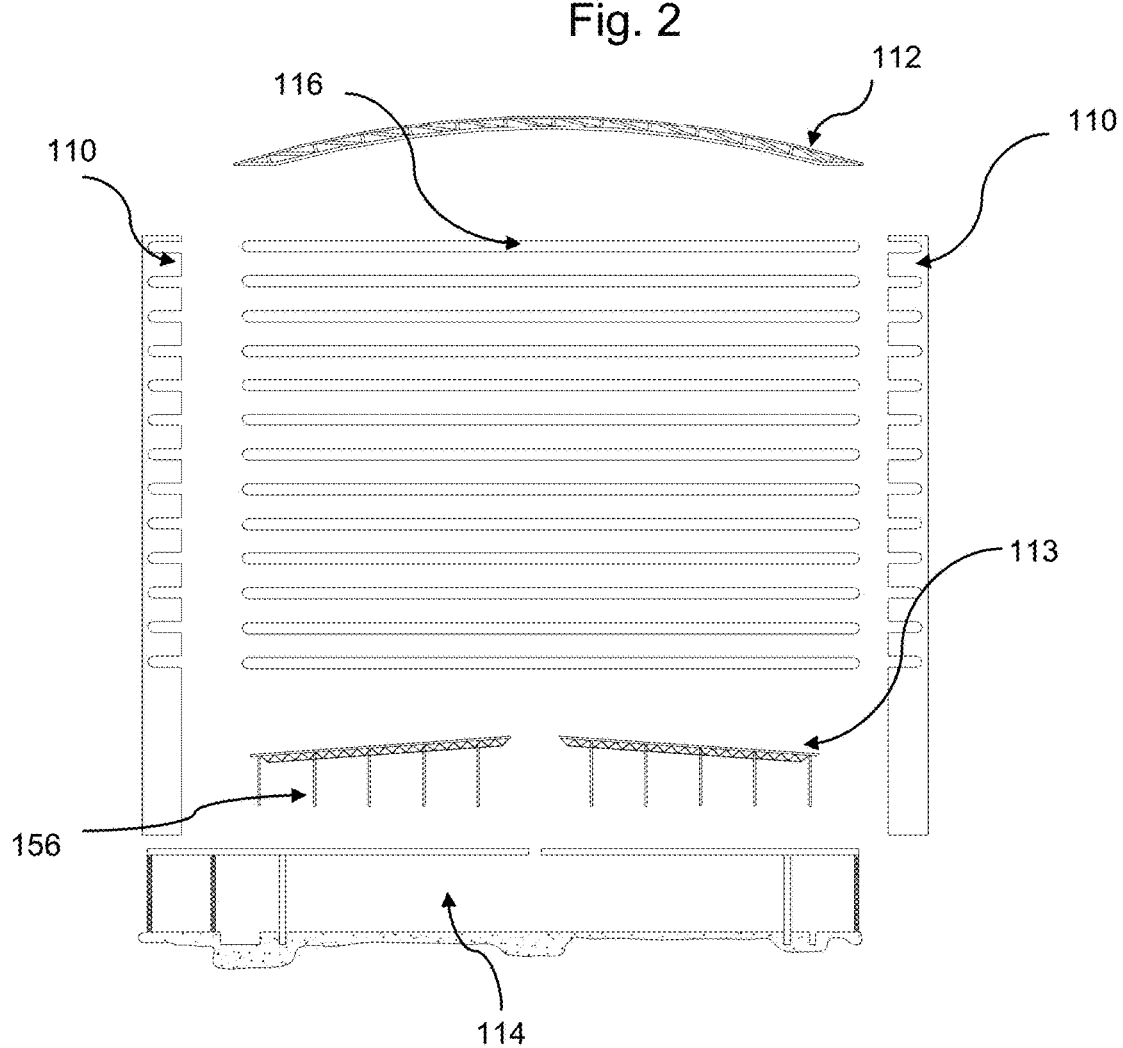
Figure 3:
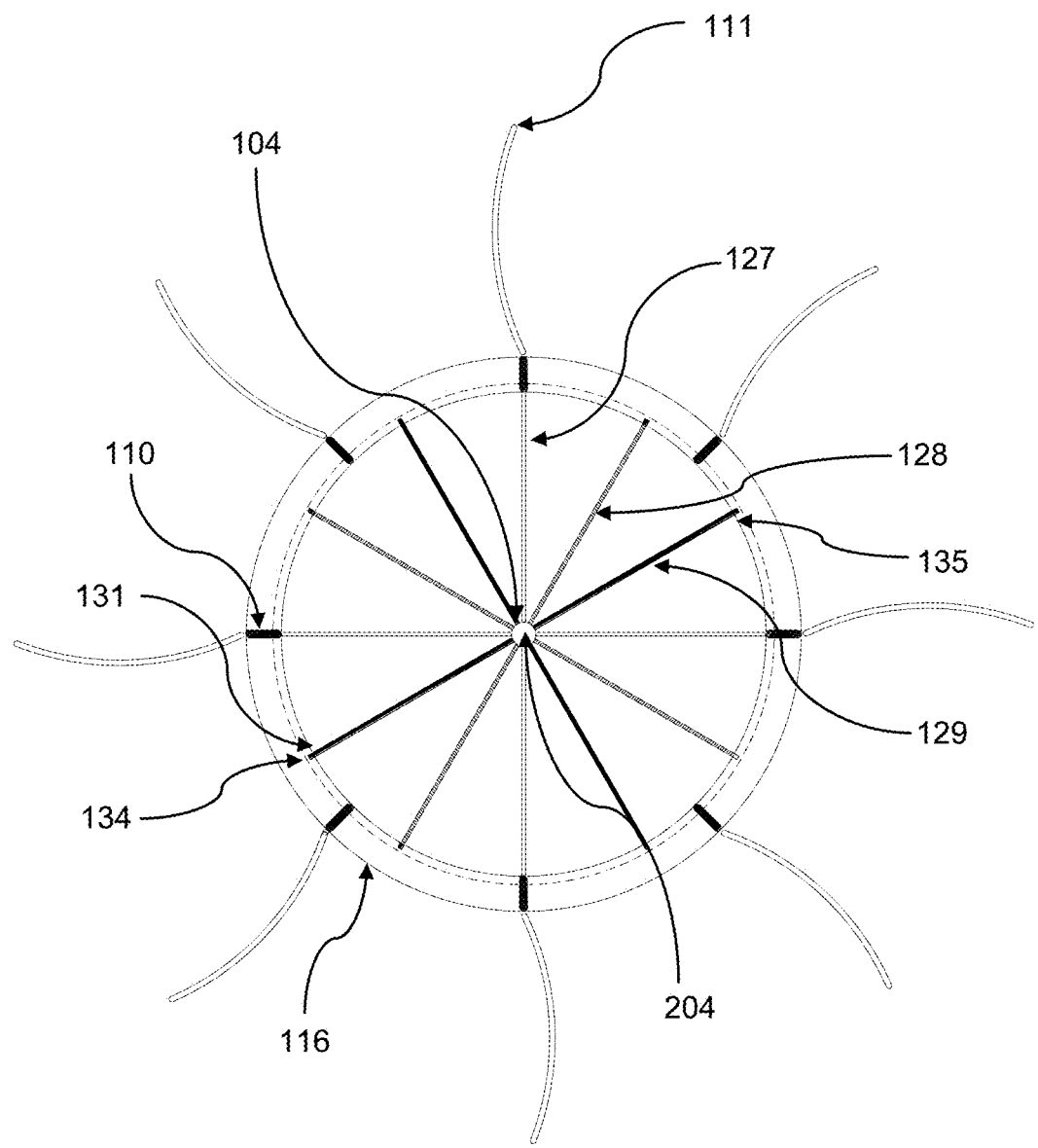
Figure 4:
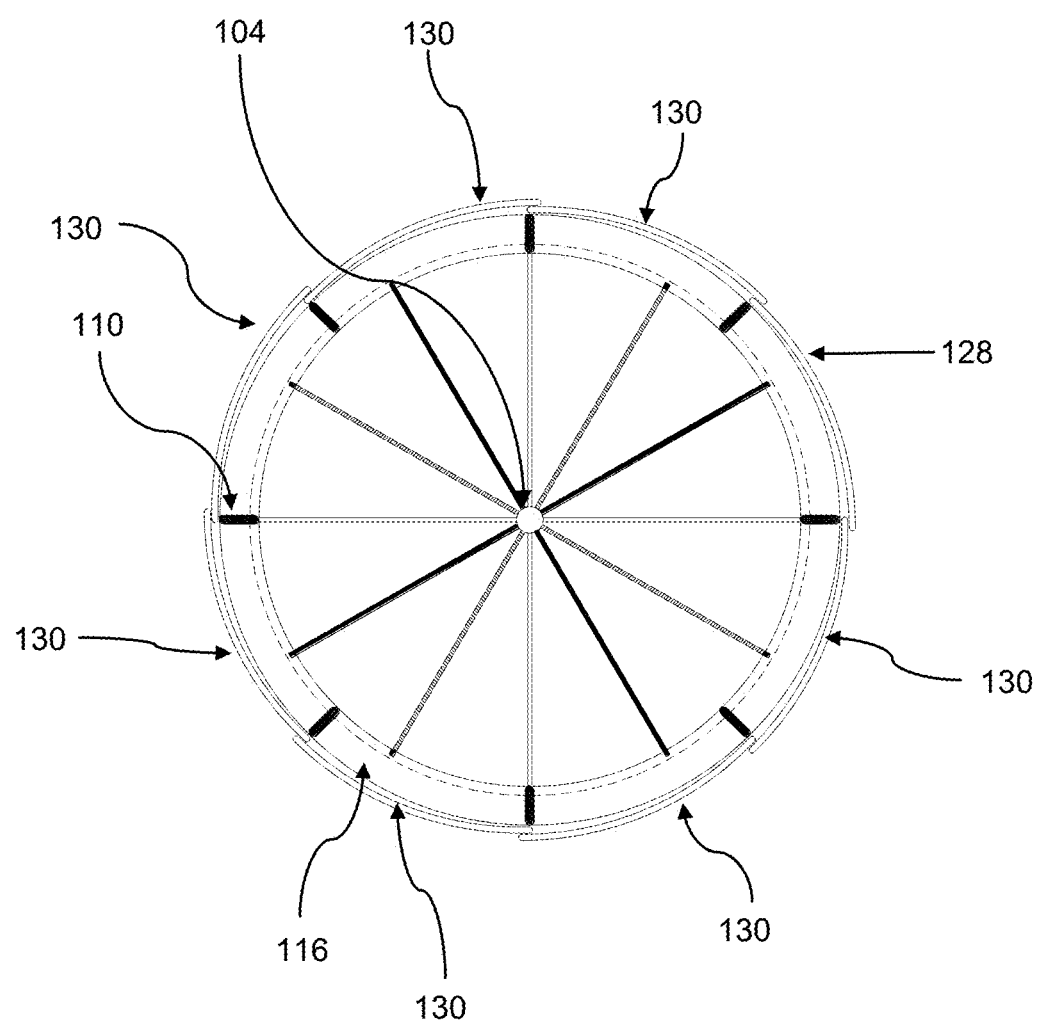
Figure 5:
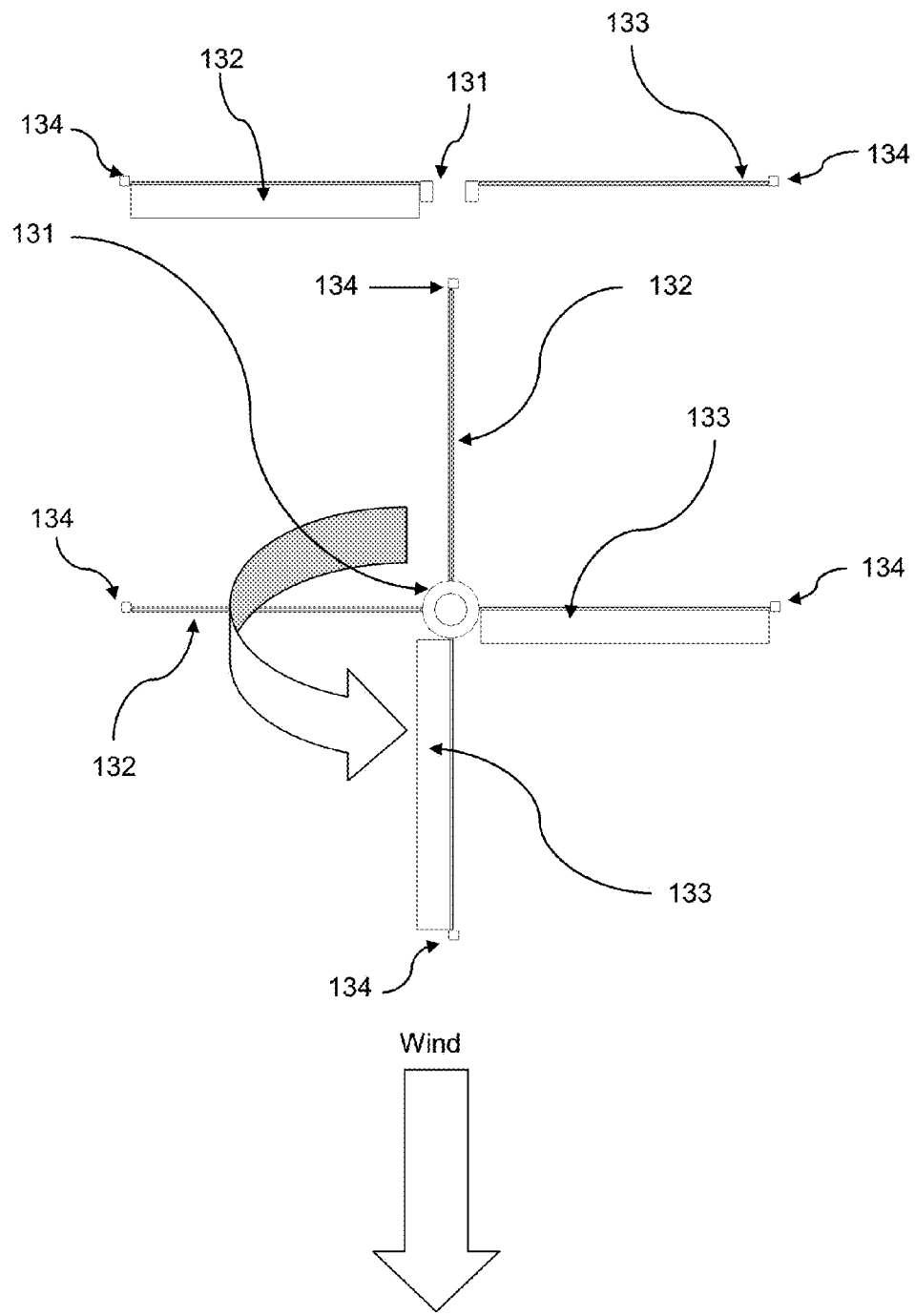
Figure 6:
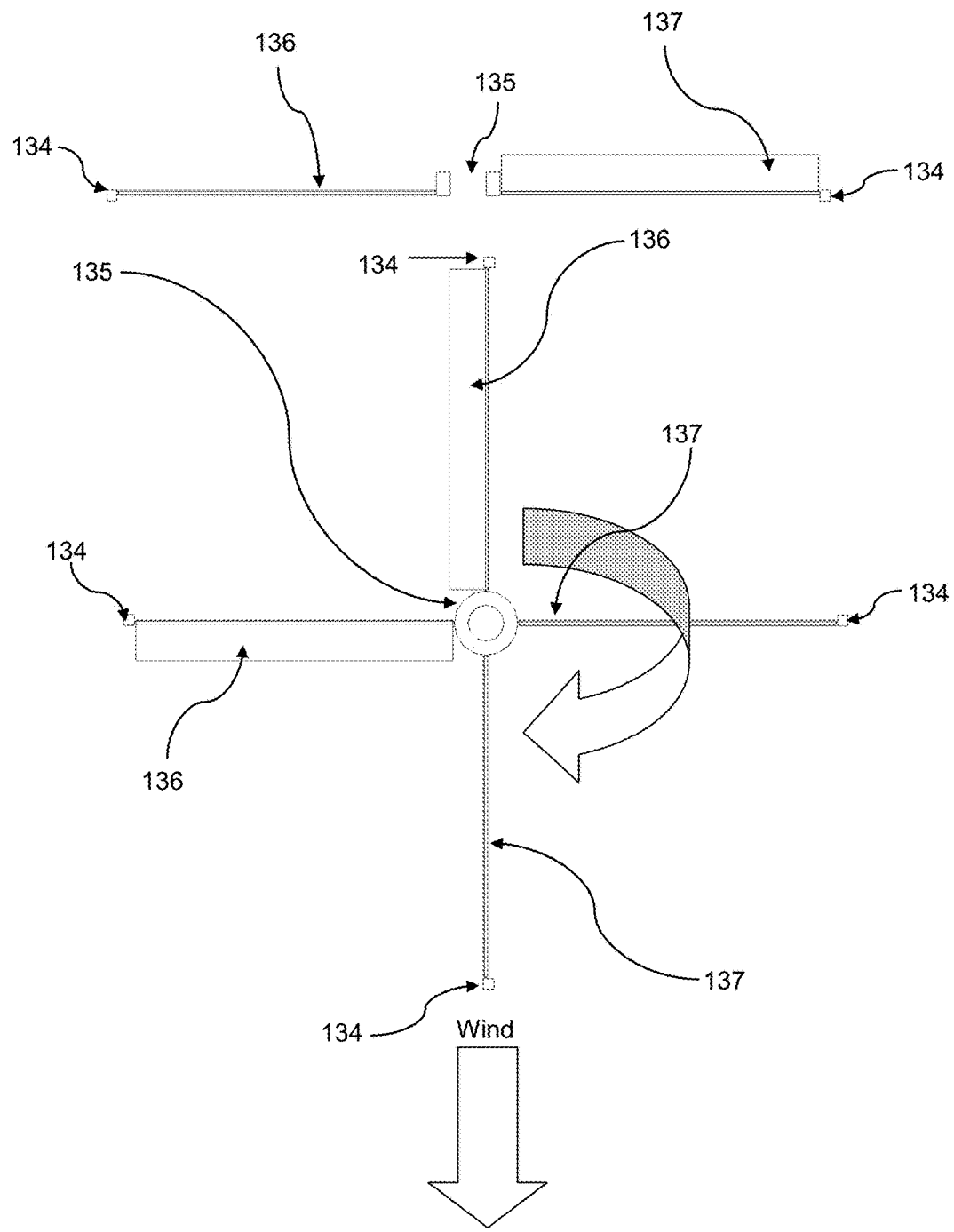
Figure 7:
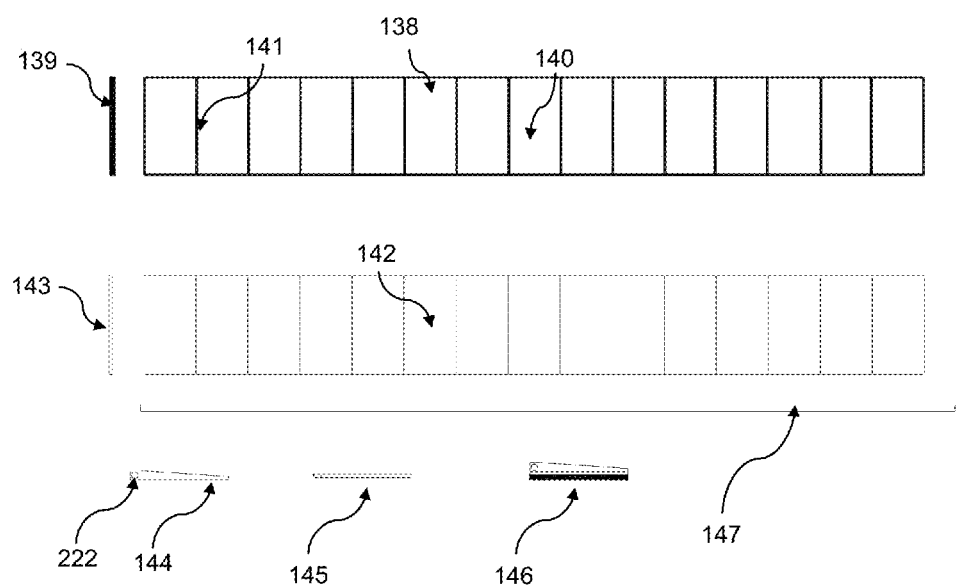
Figure 8:
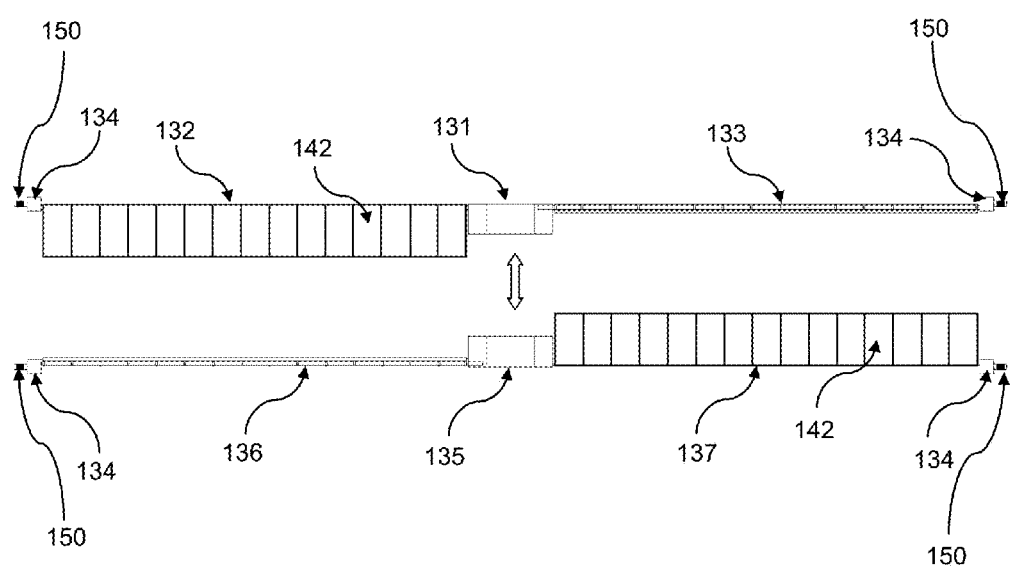
Figure 9:
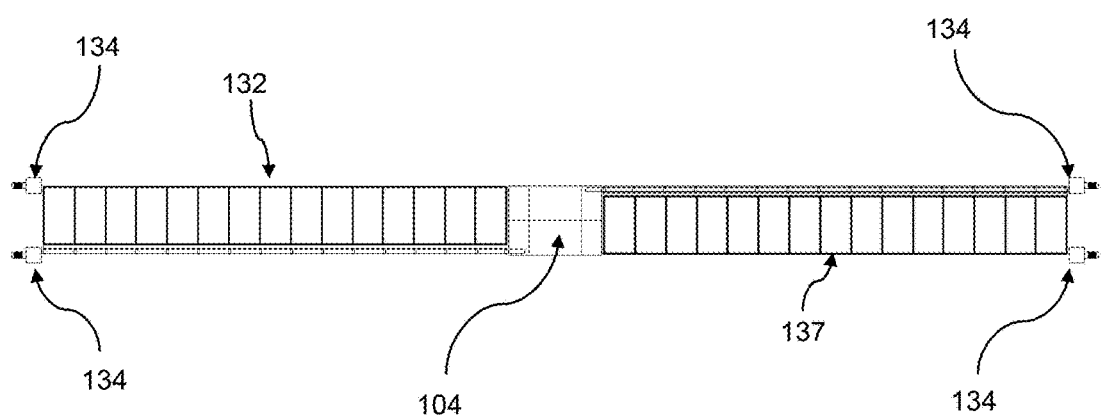
Figure 10:
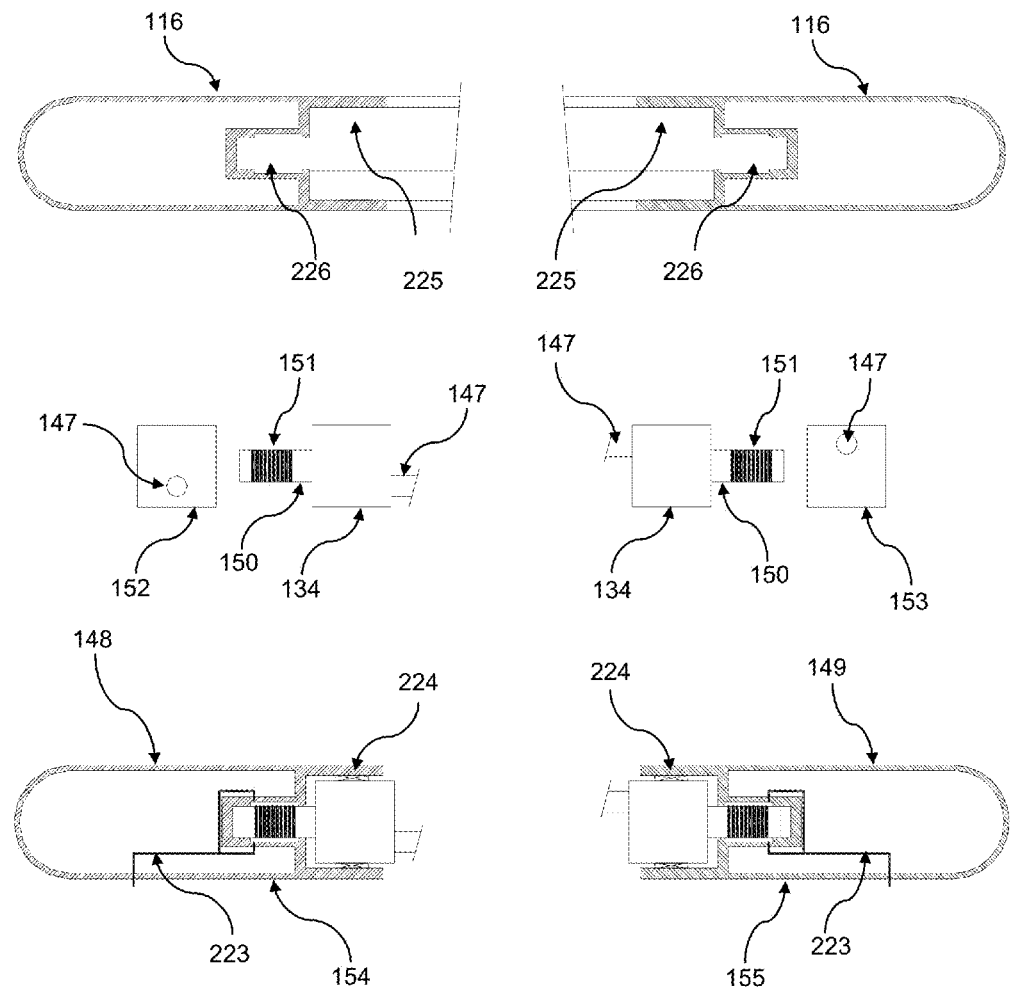
Figure 11:
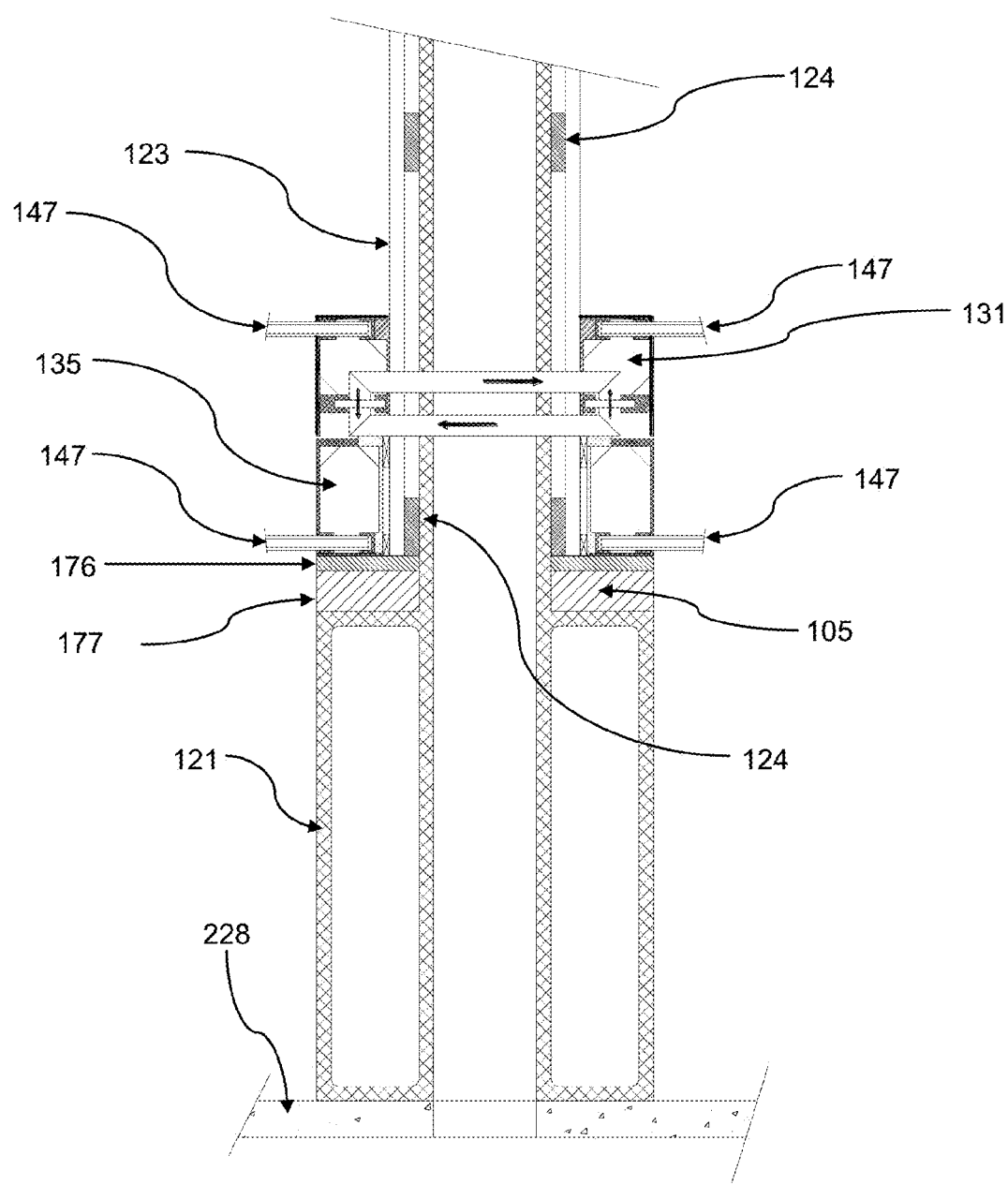
Figure 12:
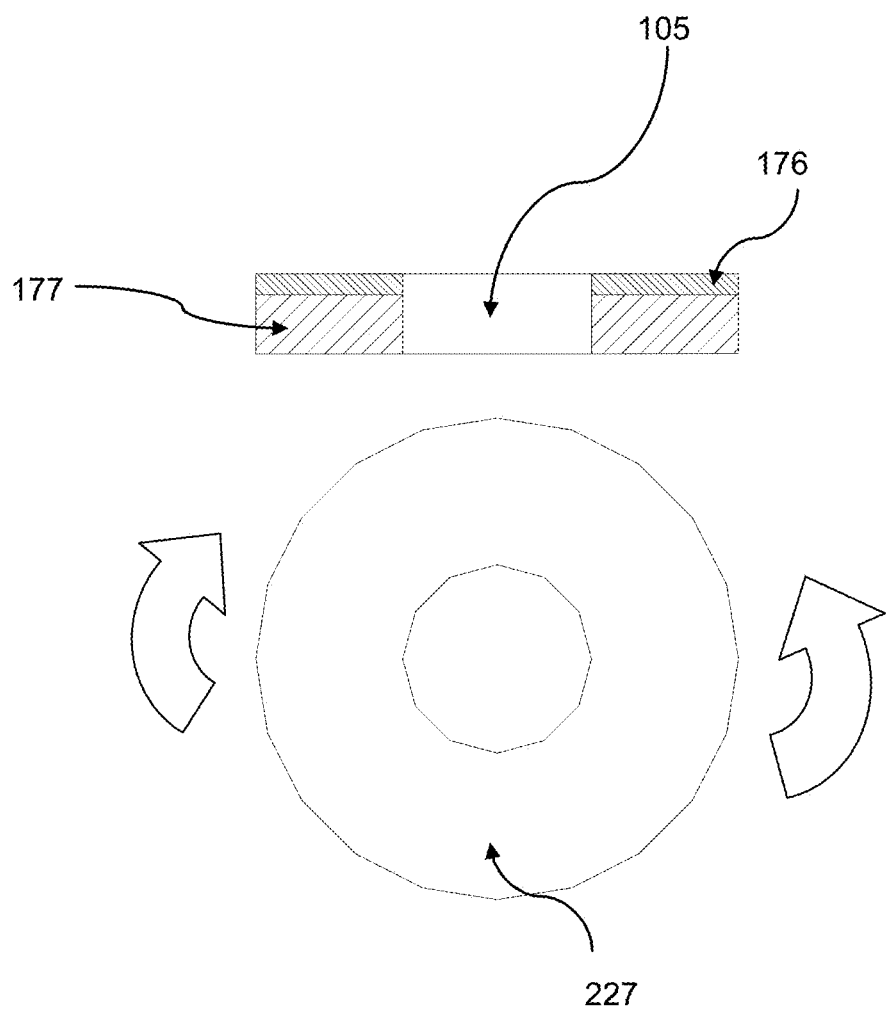
Figure 13:
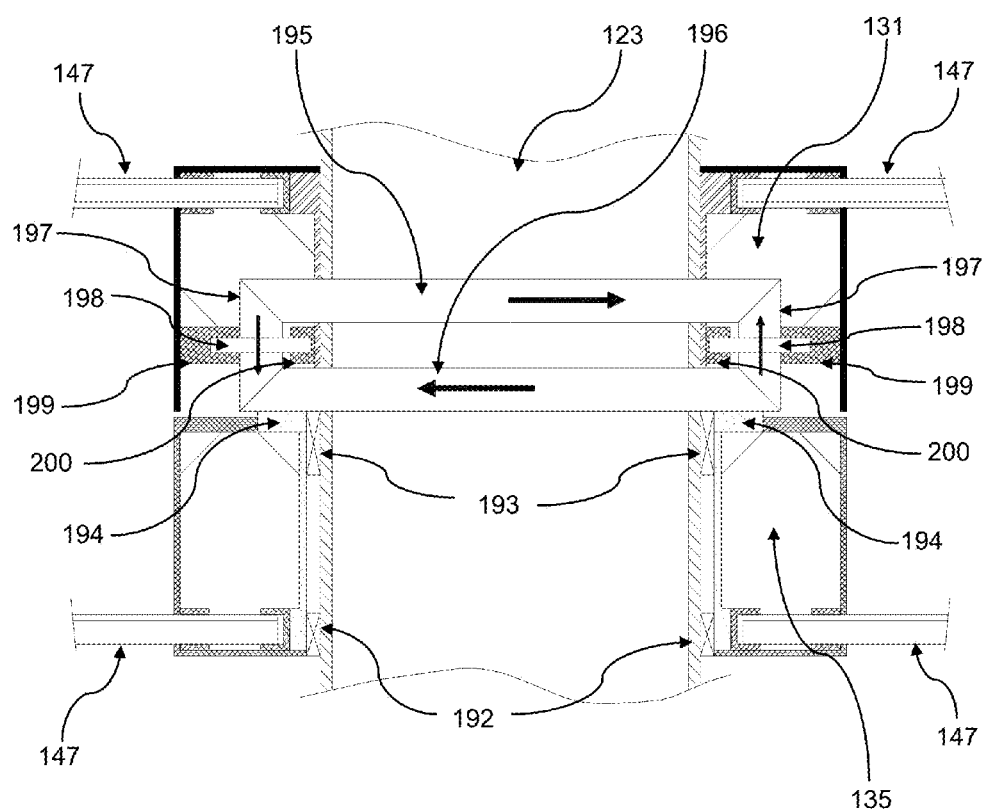
Figure 14:
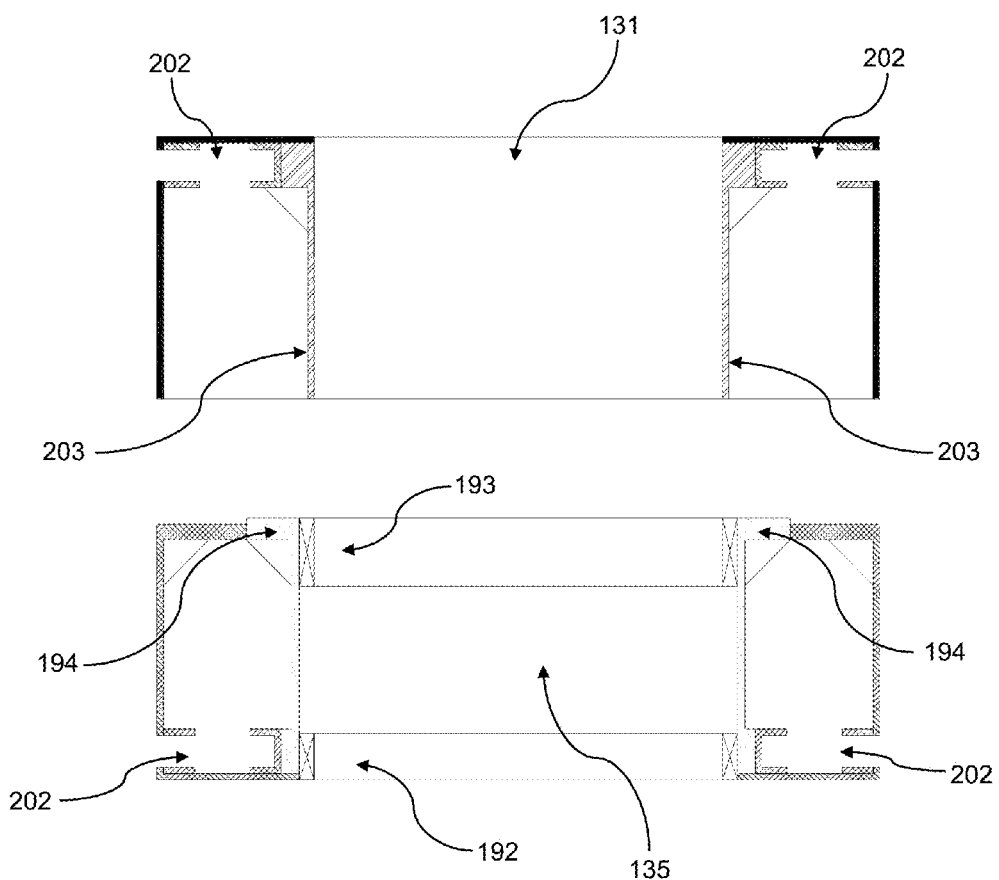
Figure 15:
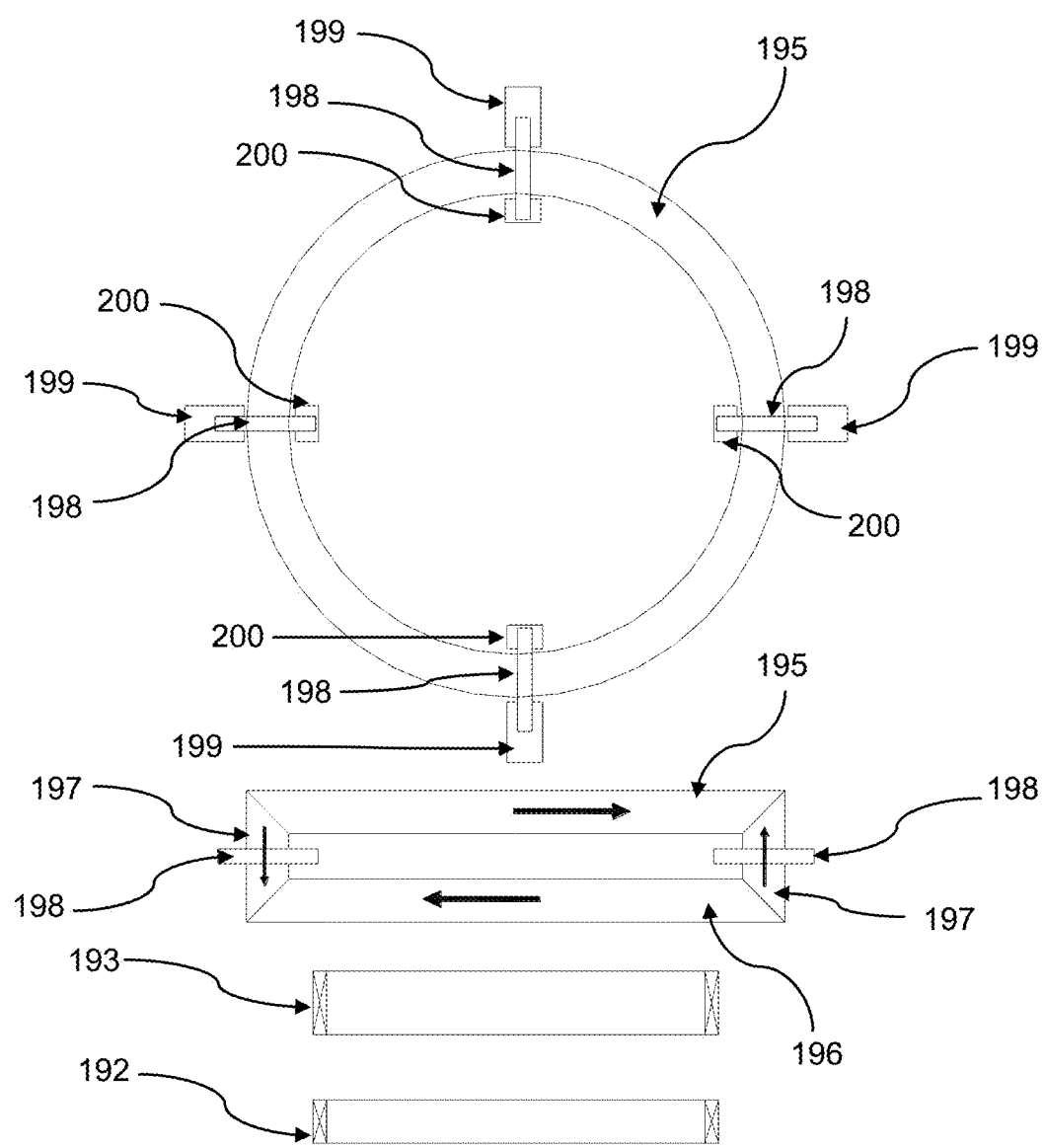
Figure 16:
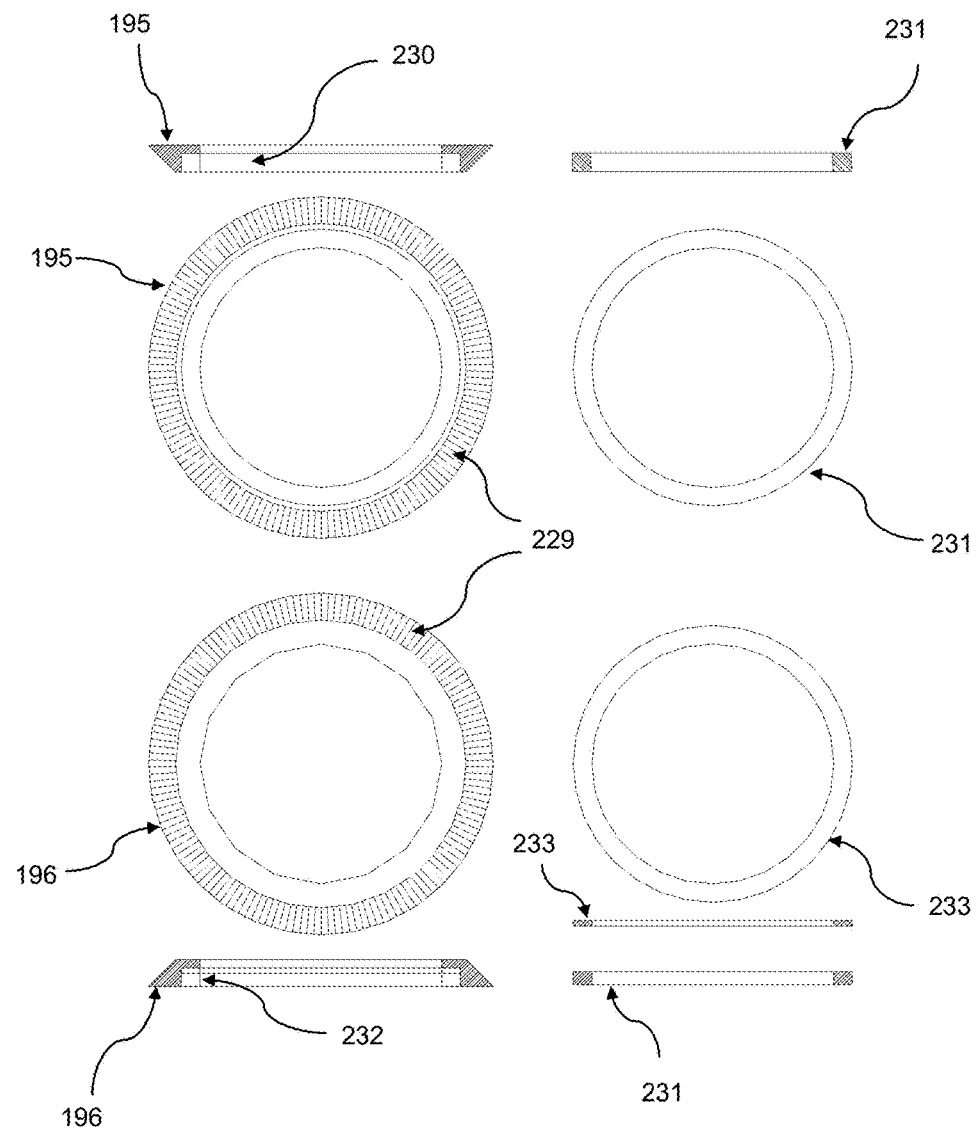
Figure 17:
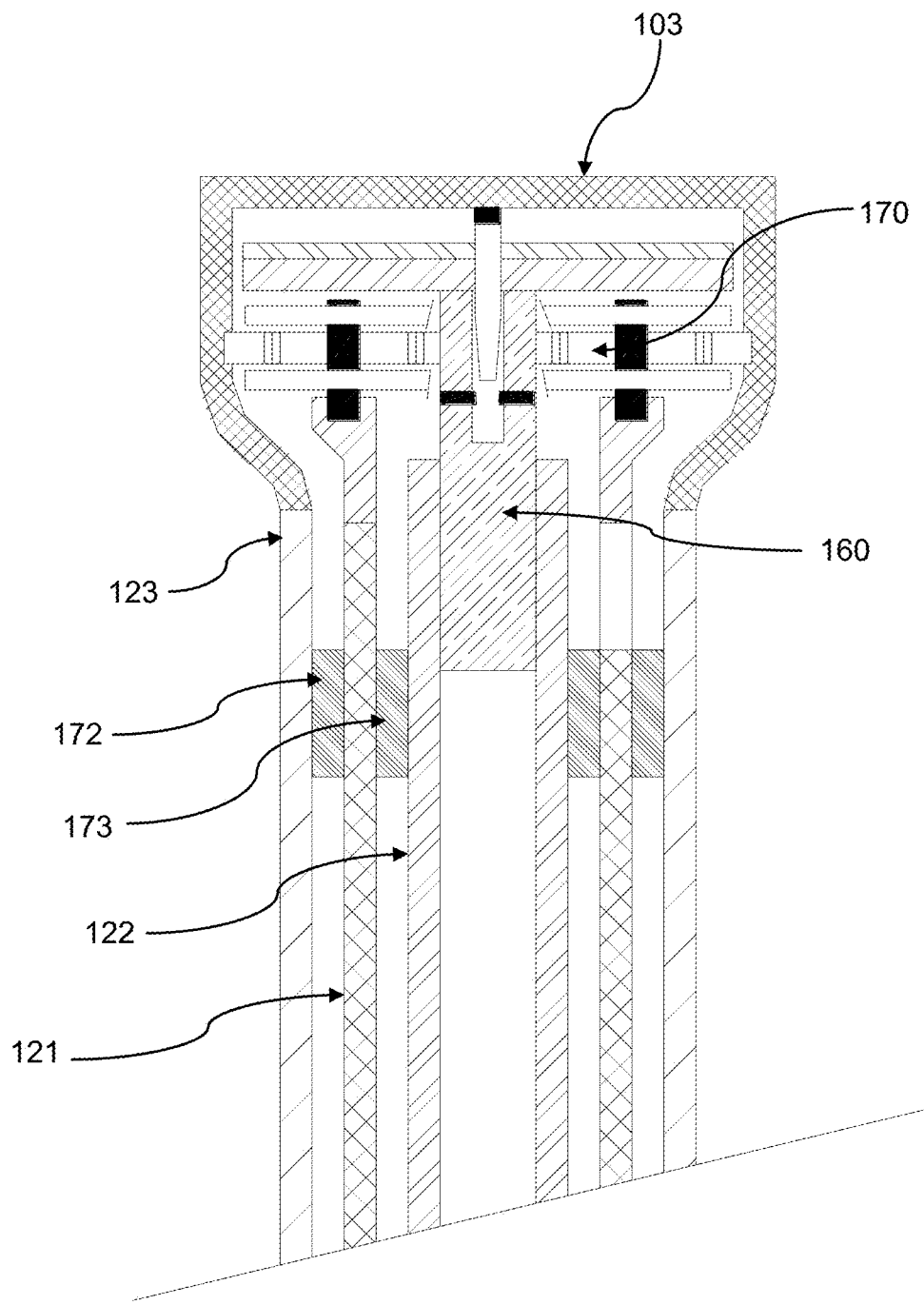
Figure 18:
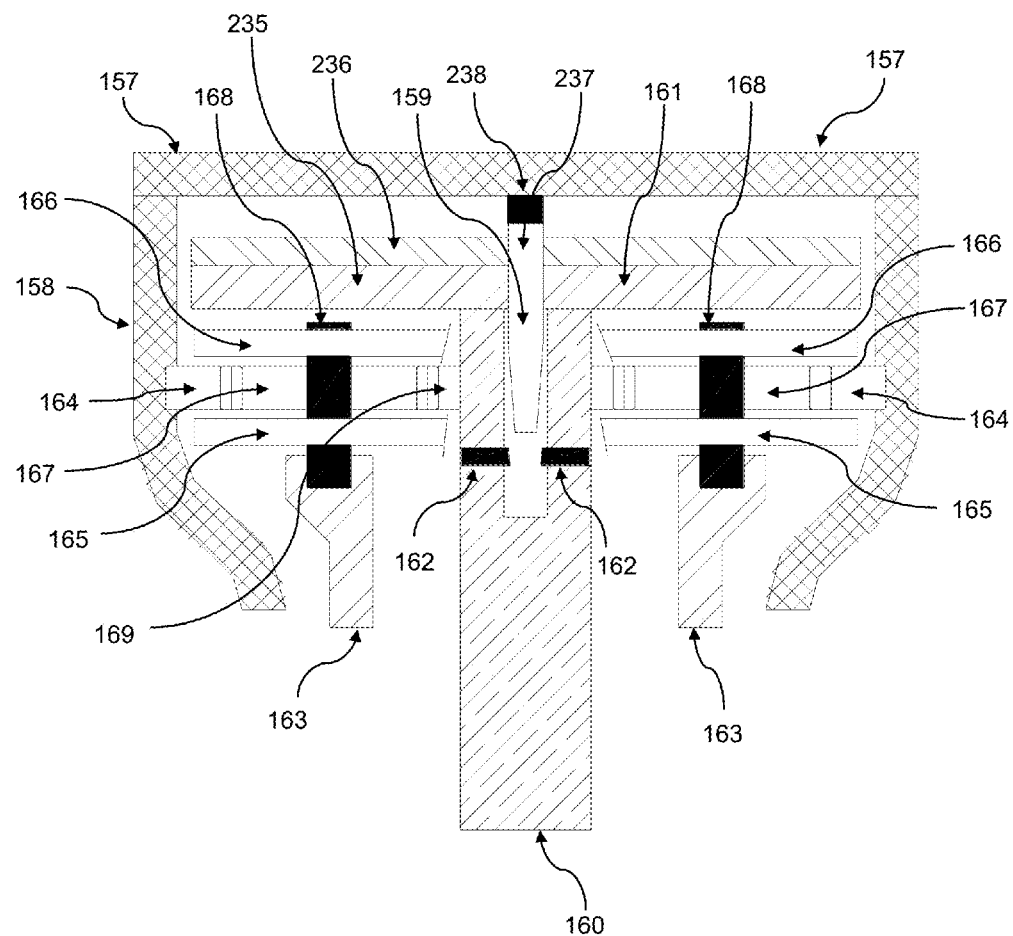
Figure 19:
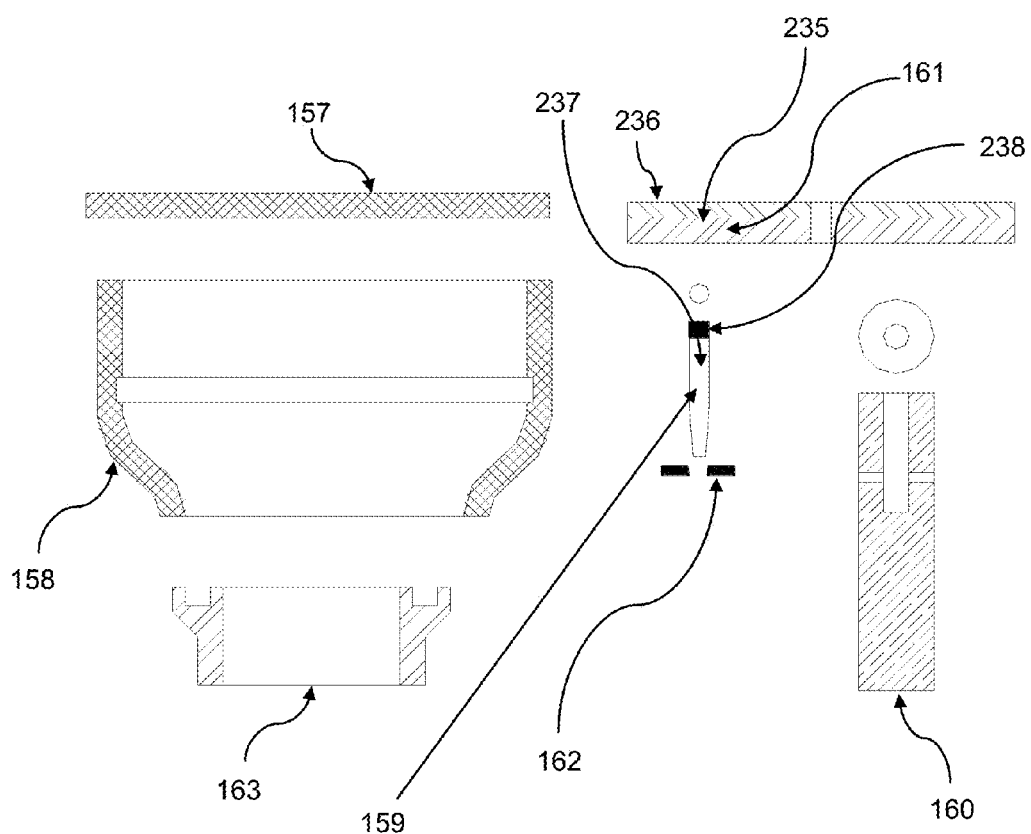
Figure 20:
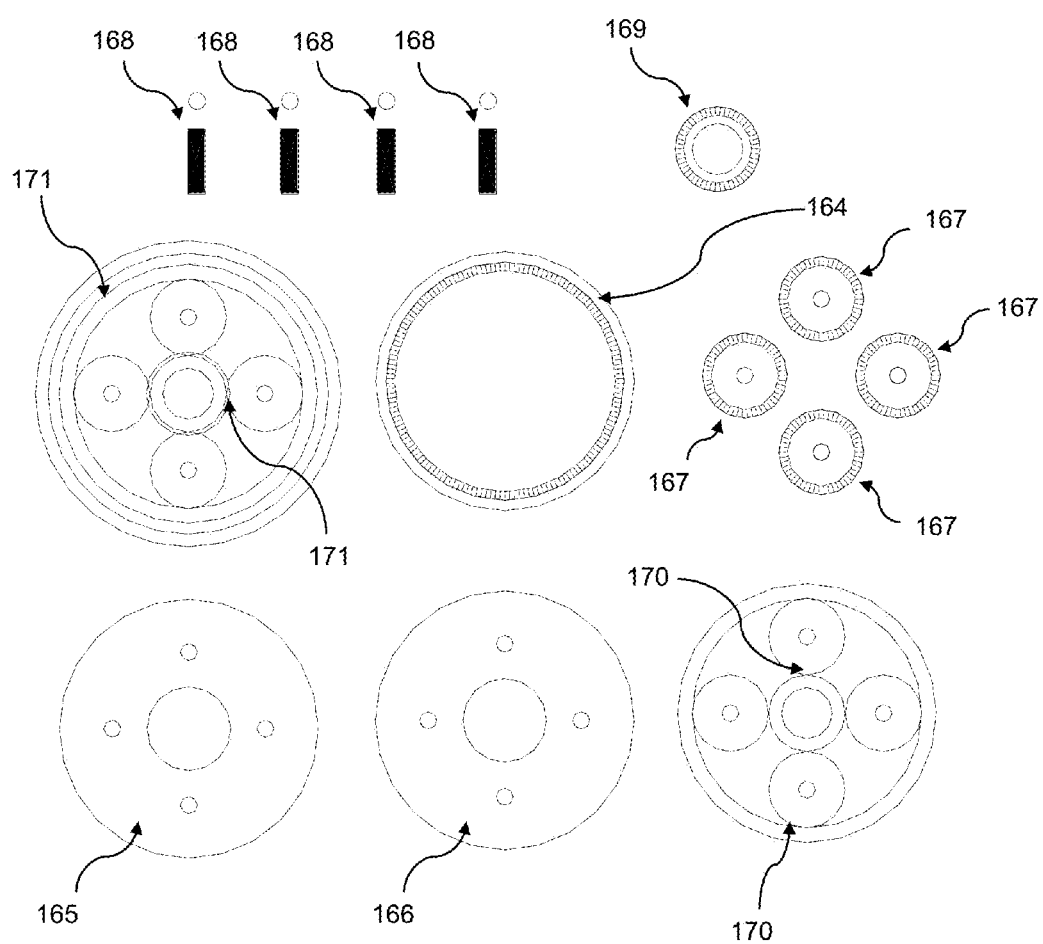
Figure 21:
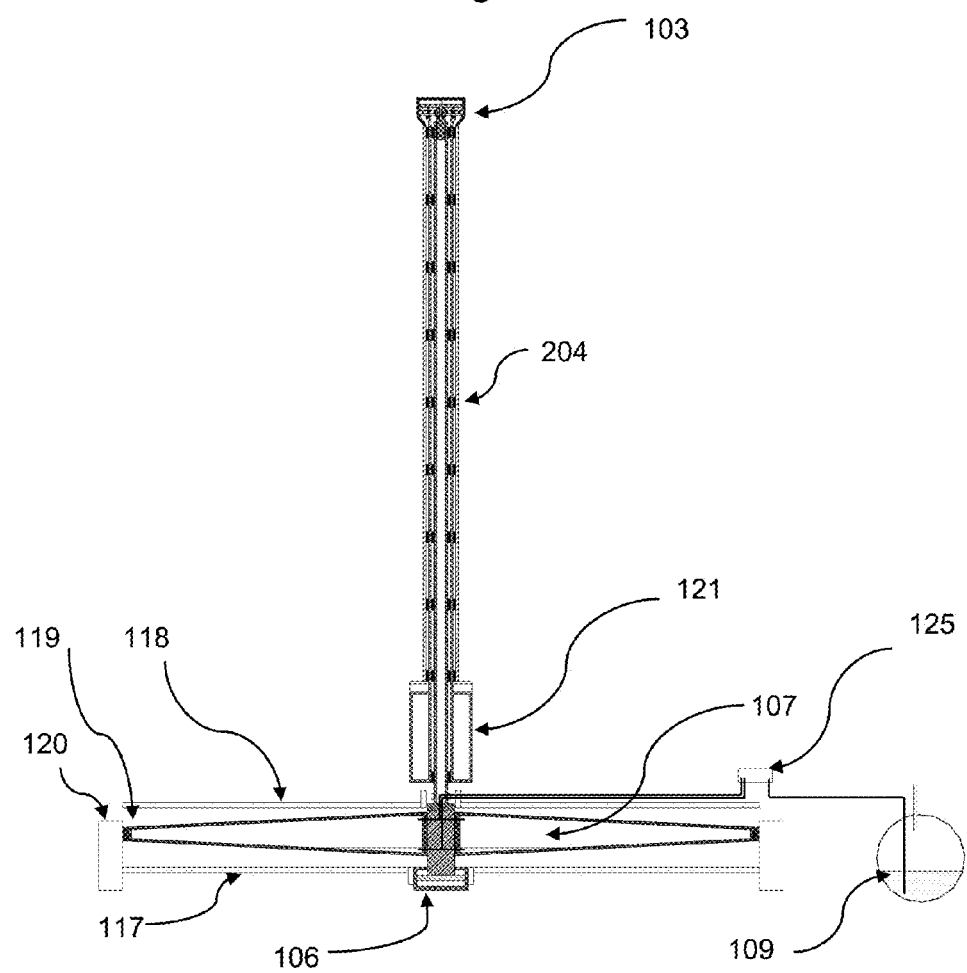
Figure 22:
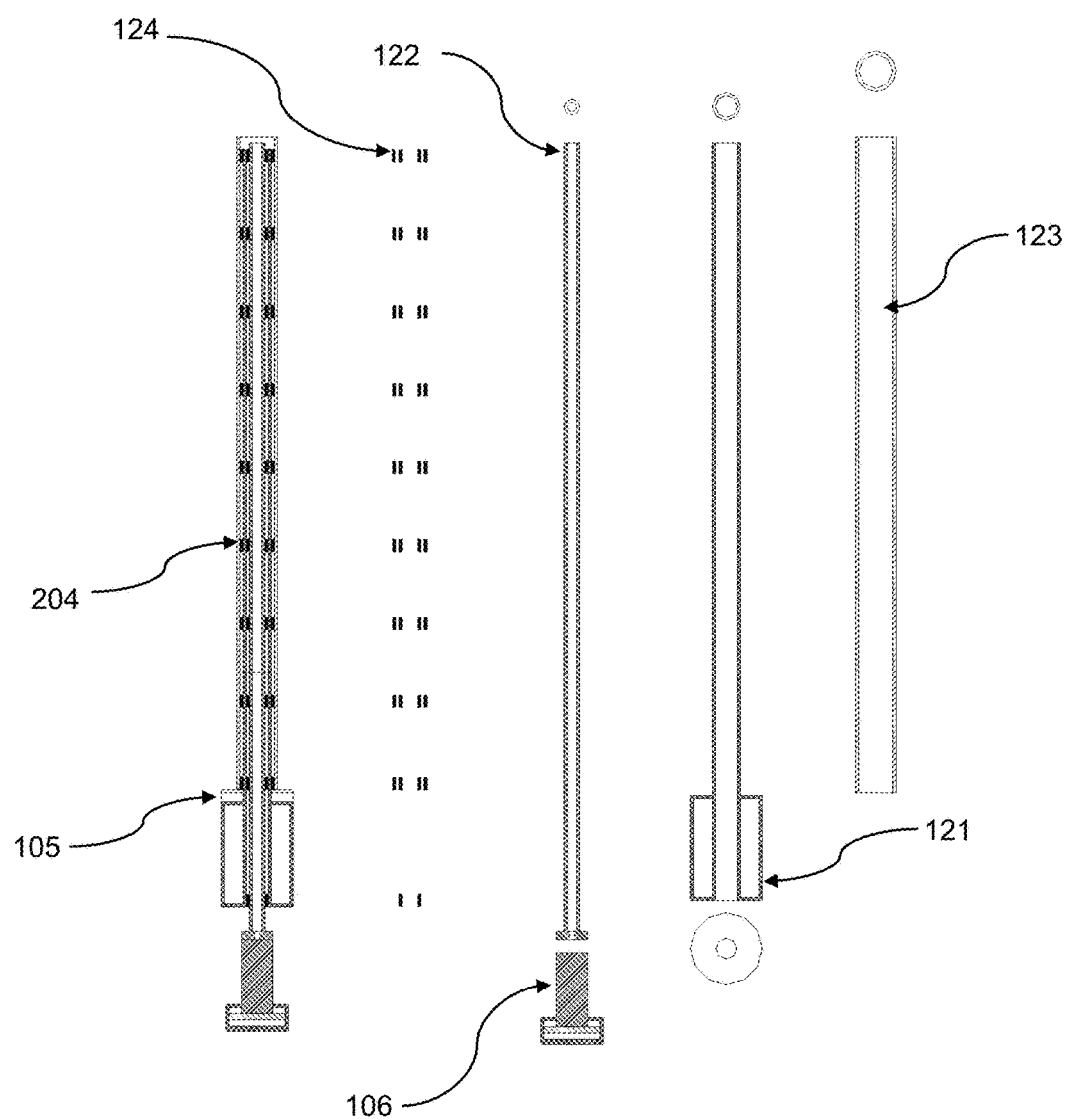
Figure 23:
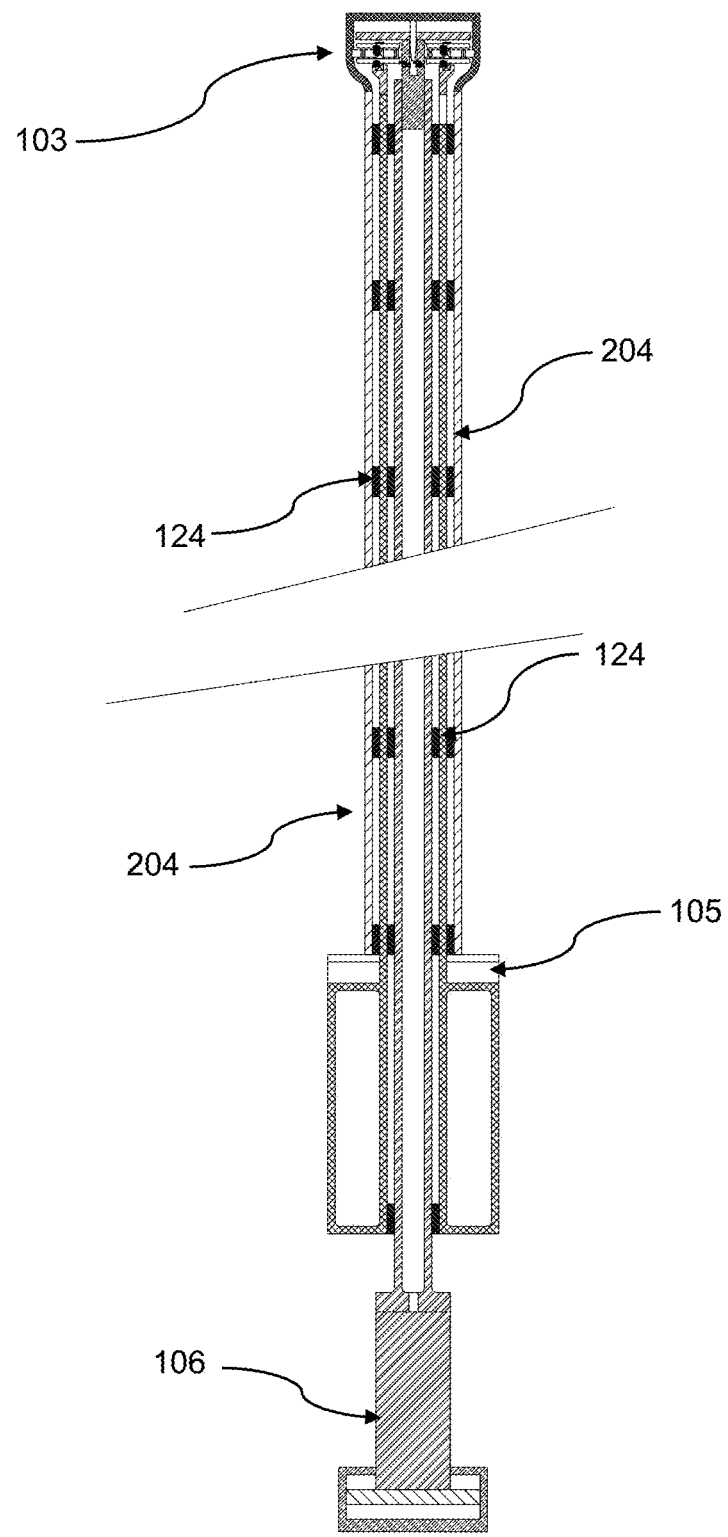
Figure 24:
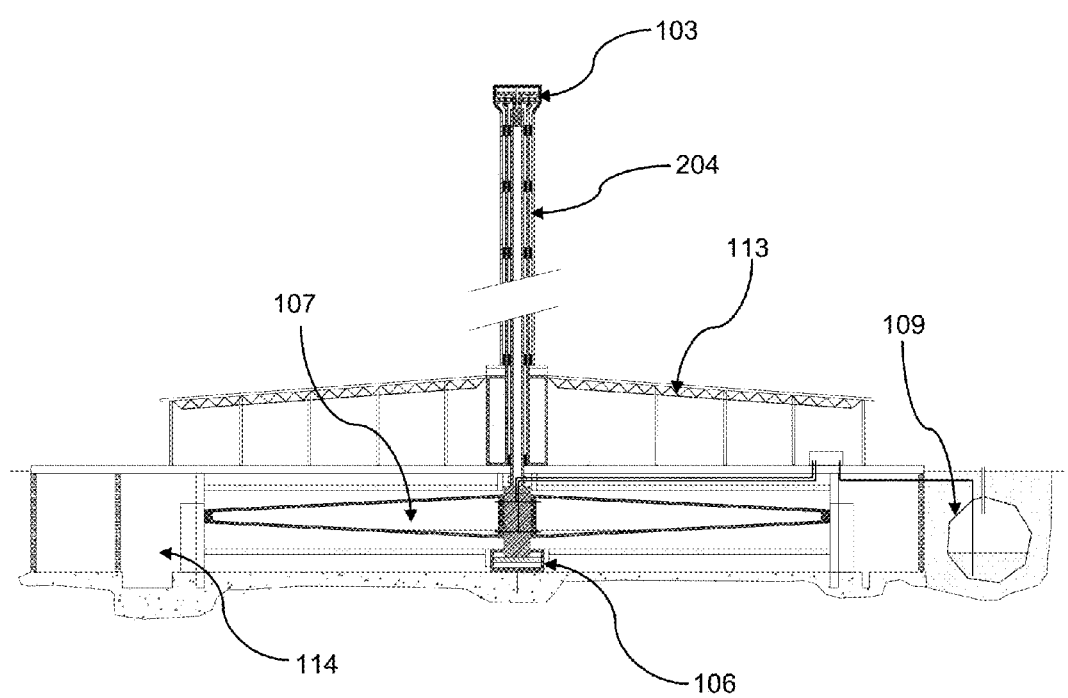
Figure 25:
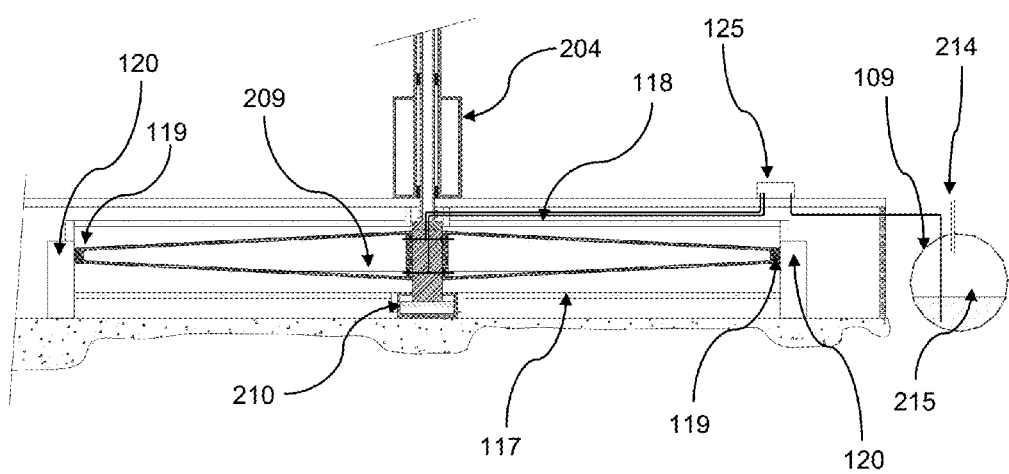
Figure 26:
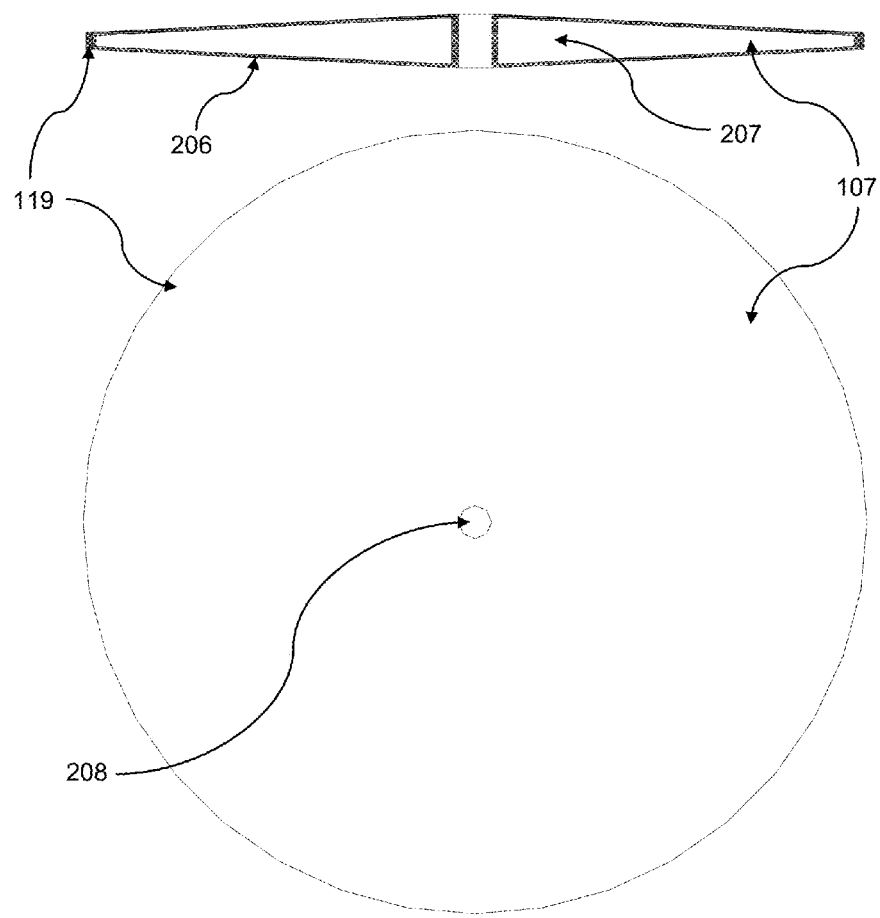
Figure 27:
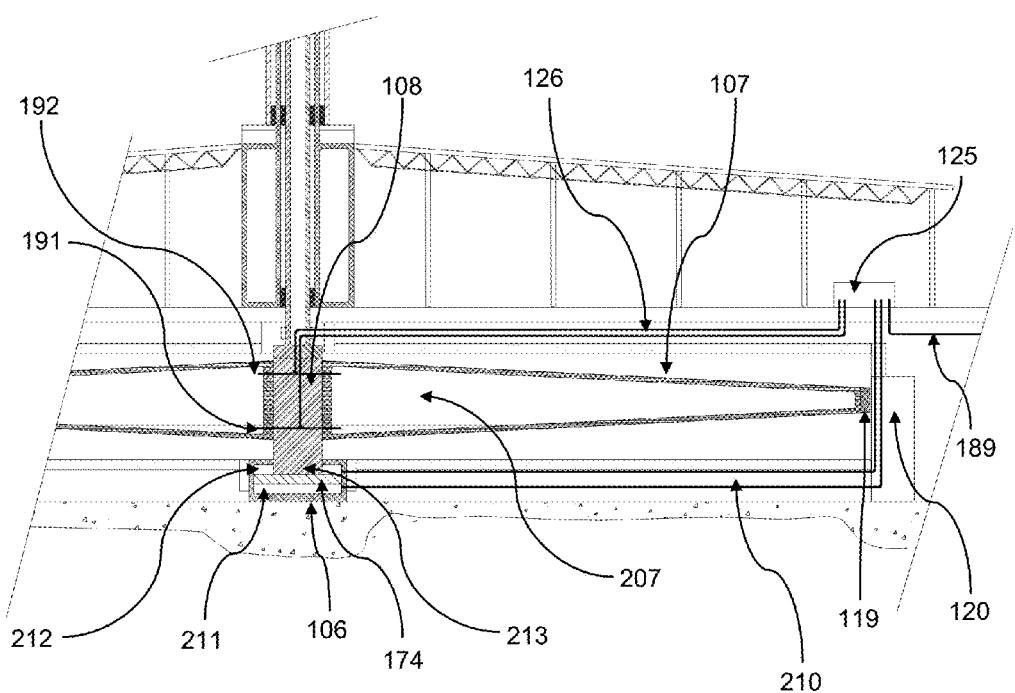
Figure 28:
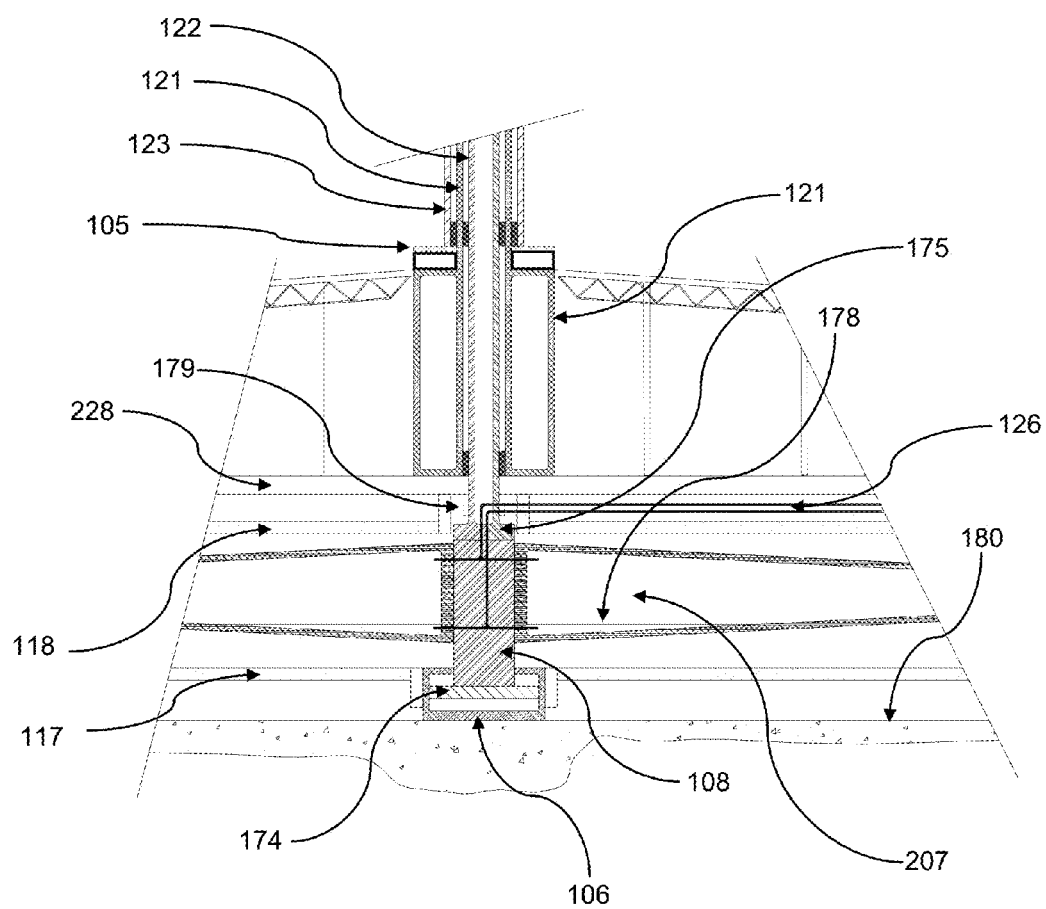
Figure 29:
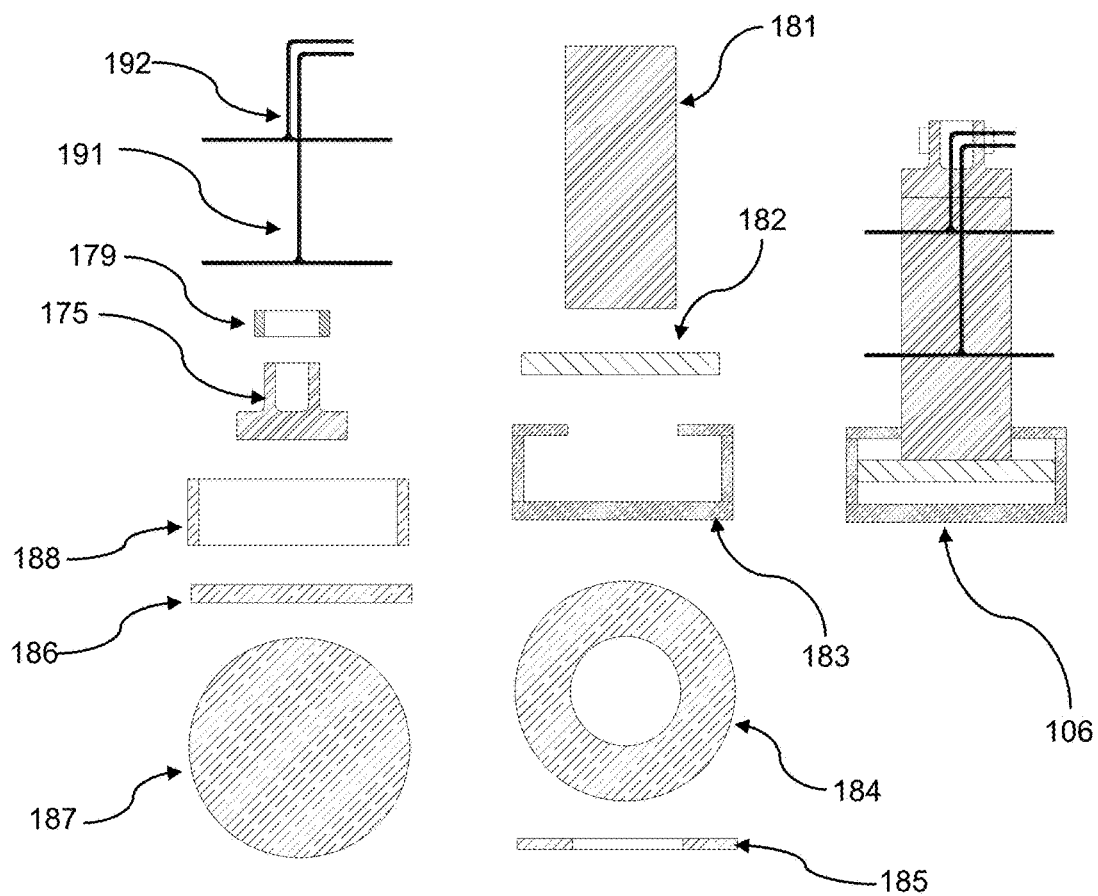
Figure 30:
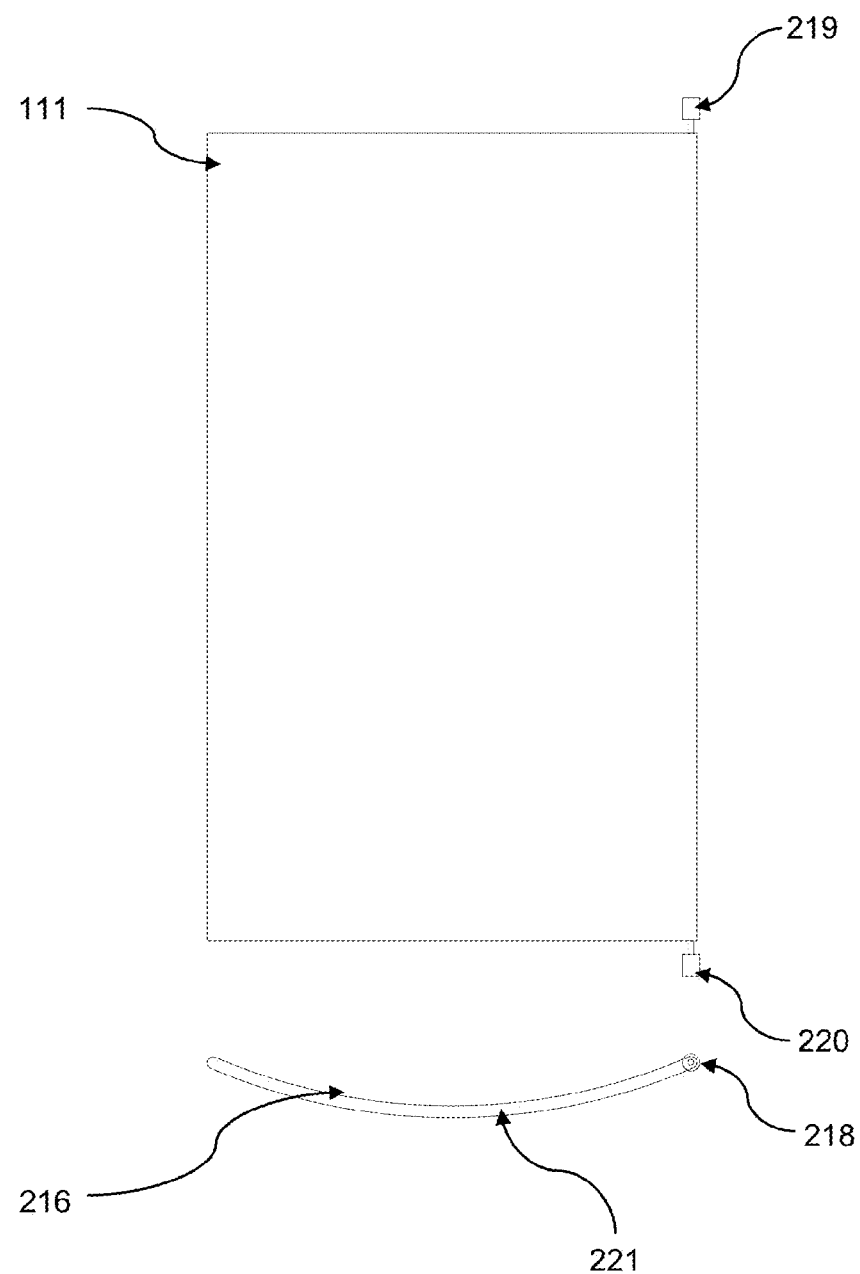
Figure 31:
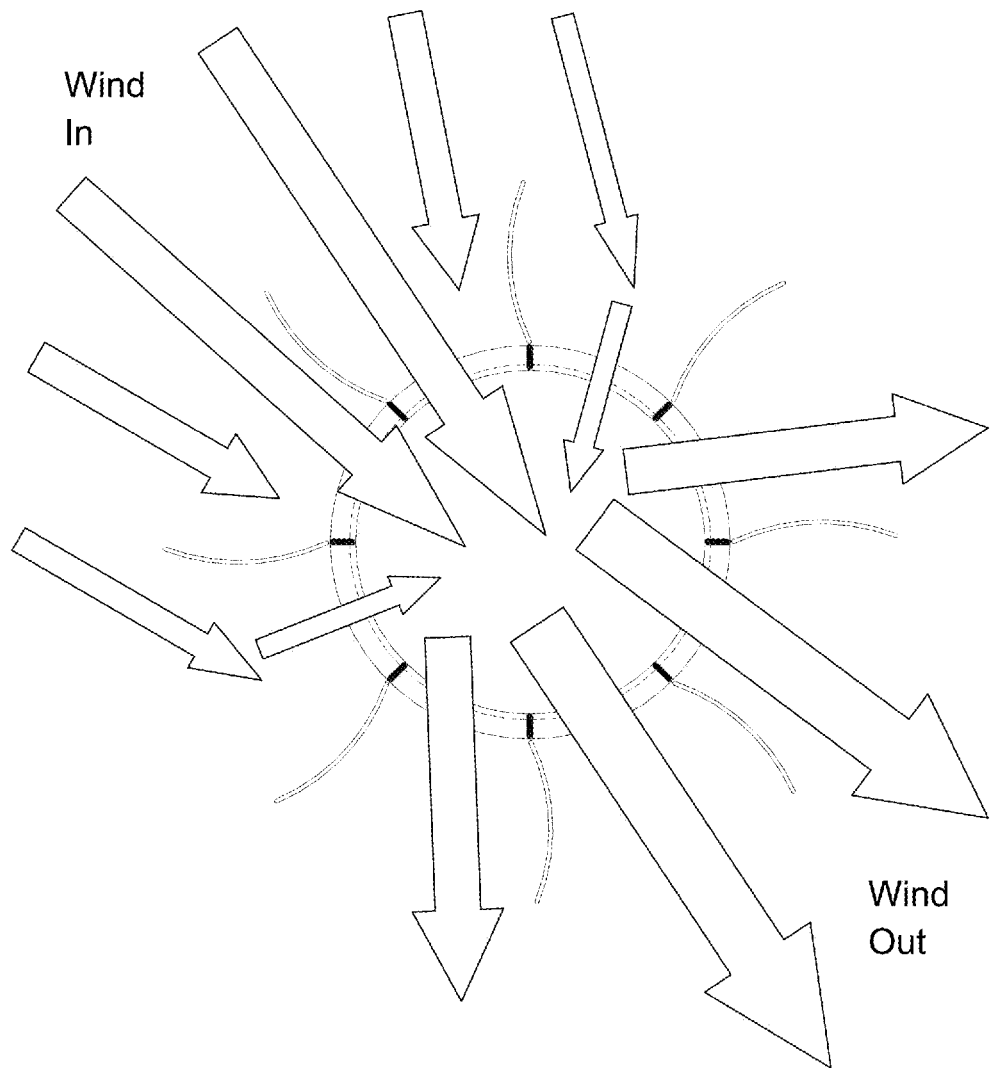
Figure 32:
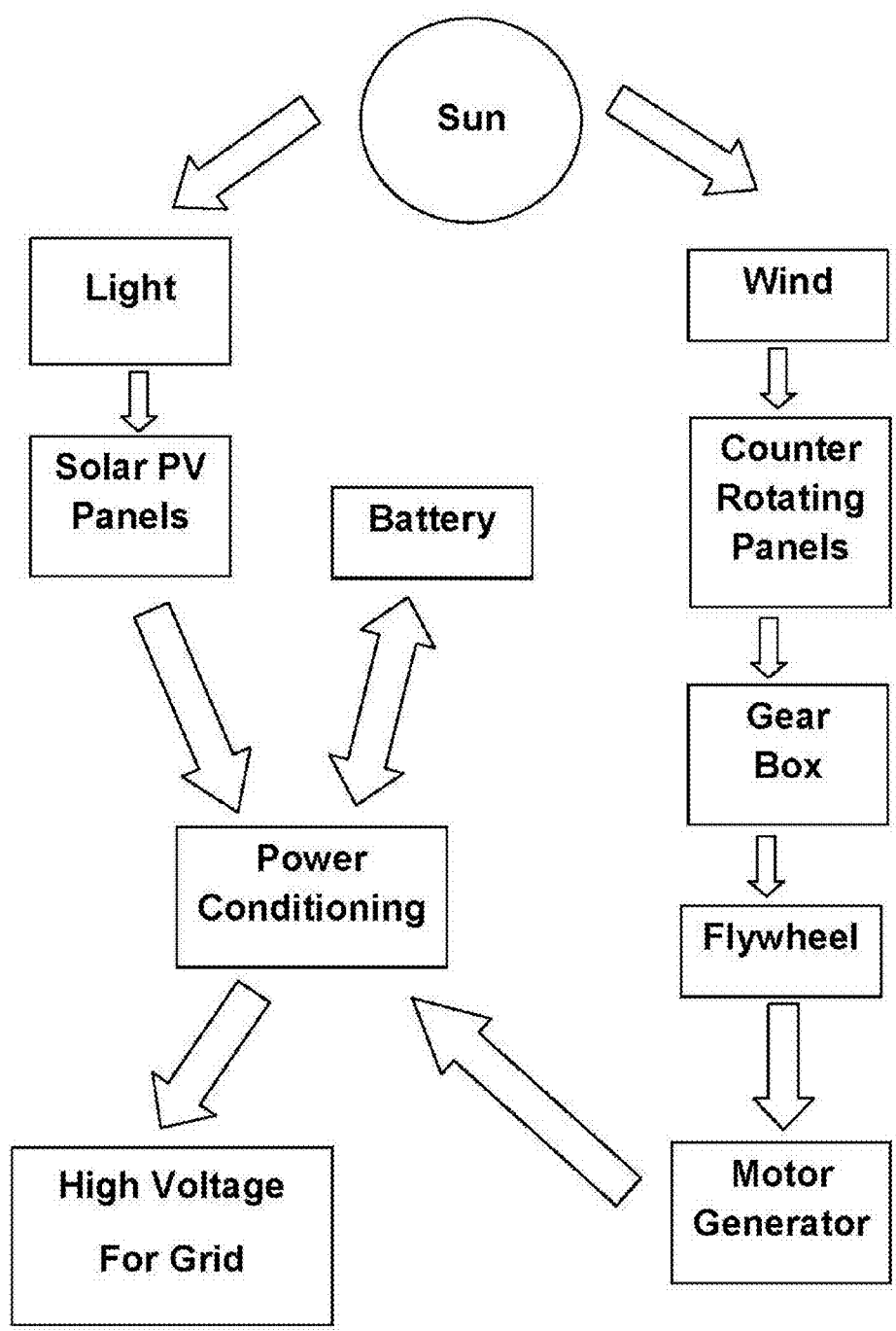
Figure 33:
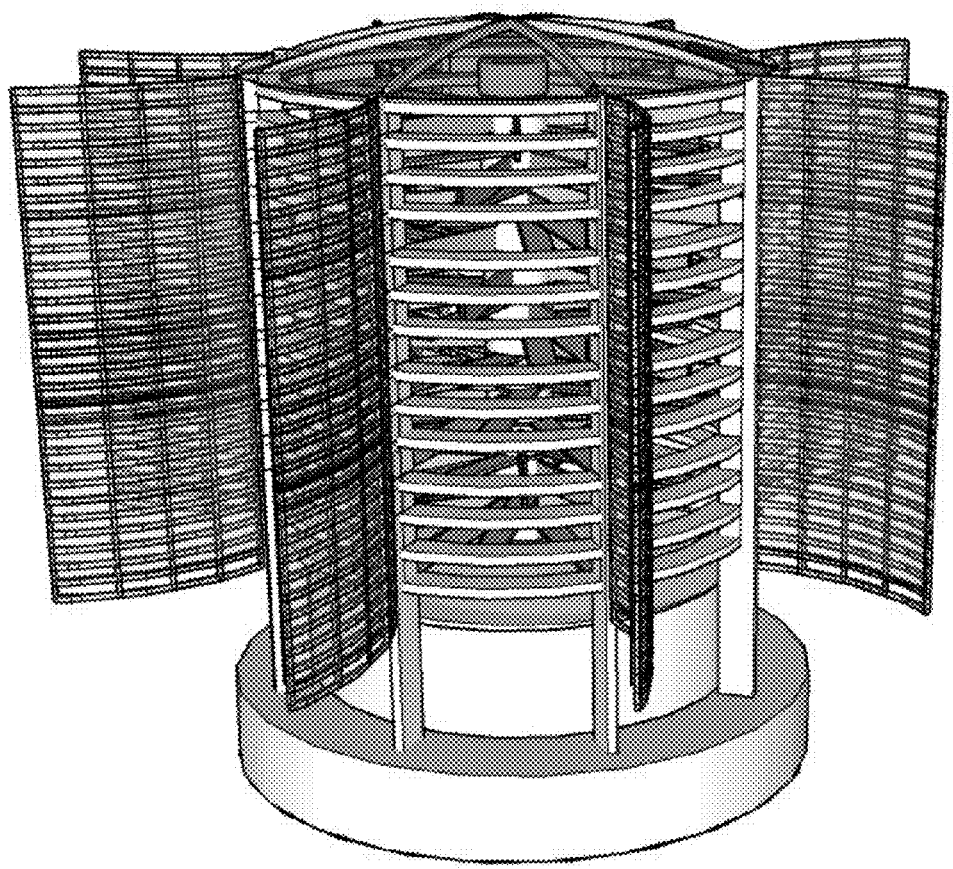
Figure 34:
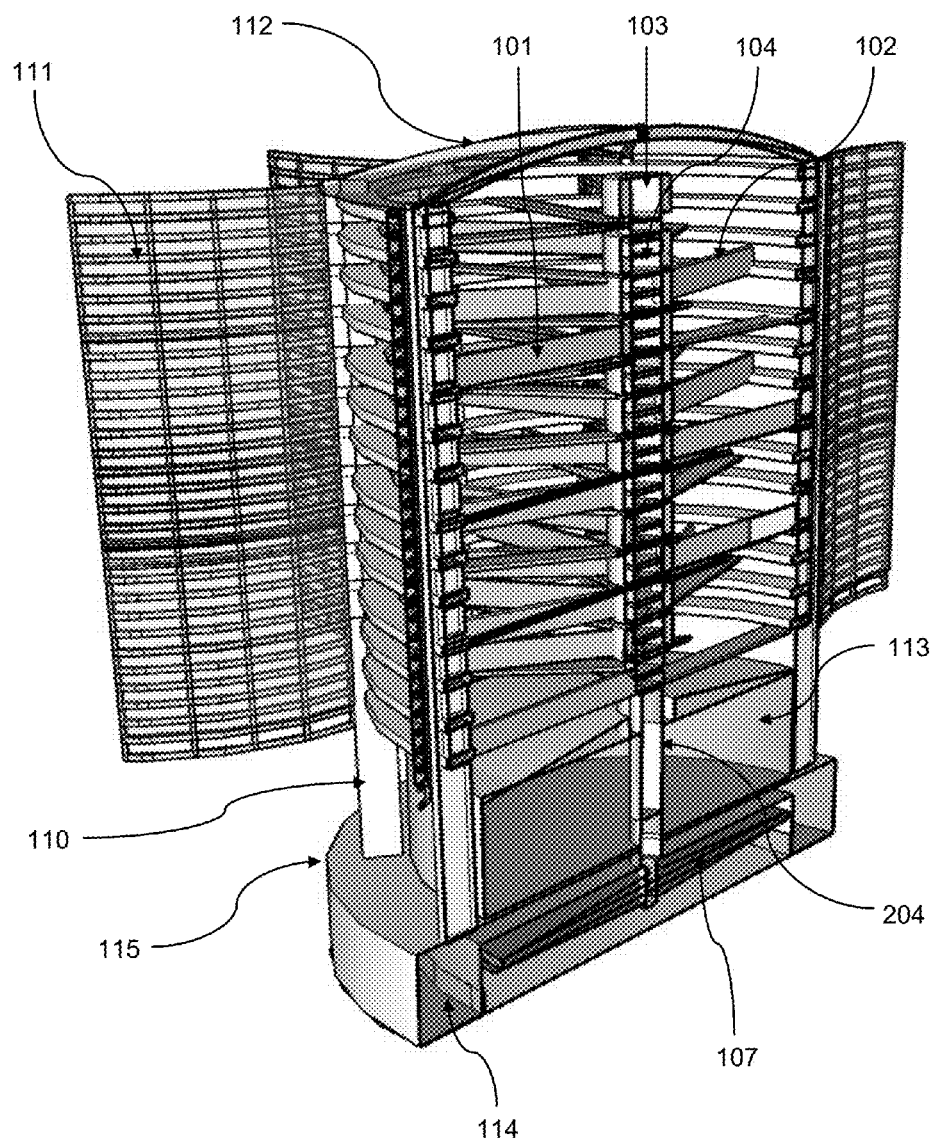

FIG. 1, Overview of the basic parts of the design
FIG. 2, Exploded view of the main structural components
FIG. 3, Plan view showing the wings open
FIG. 4, Plan view showing the wings closed
FIG. 5, Side and plan views of the top set of wind/Solar collector panels
FIG. 6, Side and plan views of the bottom set of Wind/Solar panels
FIG. 7, Main components of one Wind/Solar panel
FIG. 8, Wind/Solar panel and support and control system
FIG. 9, Servo/Stepper motor for Wind/Solar panel
FIG. 10, Counter-rotating panel assembly
FIG. 11, Rotating collar support interface
FIG. 12, Rotating Collar rotation device
FIG. 13, Counter rotating panel mounting system
FIG. 14, Upper and lower sections of counter rotation system
FIG. 15, Gear system in counter rotating system
FIG. 16, Gear detail
FIG. 17, Step Up speed gear box mounting
FIG. 18, Main components of gear box
FIG. 19, Housing of gear box
FIG. 20, Planetary Gear system detail
FIG. 21, Power collection and storage system overview
FIG. 22, Main column components
FIG. 23, Detail view of column
FIG. 24, Placement of power storage system in building
FIG. 25, Flywheel
FIG. 26, Flywheel system
FIG. 27, Flywheel support and control system
FIG. 28, Flywheel electrical power generation system
FIG. 29, Detail of hydraulic support and control device
FIG. 30, Wing, Wind diverter panel
FIG. 31, Wind flow through the VAST
FIG. 32, Flow Diagram
FIG. 33, Prospective view of a VAST
FIG. 34, Section view of a VAST

LISTING OF REFERENCE NUMBERS USED IN THE DRAWINGS

Item 101, Wind/Solar collection panel, upper
Item 102, Wind/Solar collection panel, lower
Item 103, Gear Box
Item 104, Counter rotating collar assemblies
Item 105, Column support assembly
Item 106, Main support assembly
Item 107, Flywheel assembly
Item 108, Main support for flywheel
Item 109, Hydraulic Fluid Reservoir
Item 110, Outer support column
Item 111, Wind diverter (Wing) and enclosure panel, open
Item 112, transparent roof dome
Item 113, Building roof
Item 114, Basement
Item 115, Ground level
Item 116, Support and power collector ring
Item 117, Lower scatter shield
Item 118, Upper scatter shield
Item 119, Motor generator armature
Item 120, Motor generator field
Item 121, Fixed support column
Item 122, Power transfer column
Item 123, Power collection column
Item 124, Bushings/Bearings
Item 125, Hydraulic pump assembly
Item 126, Hydraulic lines flywheel to pump
Item 127, Wind/Solar panel plan view of one set 8 panels in position 1
Item 128, Wind/Solar panel plan view of one set 8 panels in position 2
Item 129, Wind/Solar panel plan view of one set 8 panels in position 3
Item 130, Wind diverter and enclosure panel, closed
Item 131, Counter rotating energy collecting collar assembly, top
Item 132, Wind/Solar energy collection panel, upper assembly in down position
Item 133, Wind/Solar energy collection panel, upper assembly in up position
Item 134, Servo/Stepper motor
Item 135, Counter rotating energy collecting collar assembly, bottom
Item 136, Wind/Solar energy collection panel, lower assembly in down position
Item 137, Wind/Solar energy collection panel, lower assembly in up position
Item 138, Air dam frame for wind solar collection panels
Item 139, Air dam frame for wind solar collection panels, side view
Item 140, Opening for wind solar panel
Item 141, Air dam divider
Item 142, Individual solar PV panel
Item 143, Individual solar PV panel, side view
Item 144, Wind/Solar panel stiffener
Item 145, Wind/Solar panel stiffener, side view
Item 146, Assembly Wind/Solar panel and stiffener, side view
Item 147, Rotational Shaft
Item 148, Cross section of item 116 support and power collector ring left
Item 149, Cross section of item 116 support and power collector ring right
Item 150, Connector shaft
Item 151, Power and signal conductive rings Item 152, Front view Servo/Stepper motor for bottom panels
Item 153, Front view Servo/Stepper motor for top panels
Item 154, Cross section Item 148 with Item 152 installed
Item 155, Cross section Item 149 with Item 153 installed
Item 156, Building roof supports
Item 157, Gear box top
Item 158, Gear box shell
Item 159, Sun gear lock plunger assembly
Item 160, Adapter to flywheel assembly shaft
Item 161, Wind/Solar assembly lift disk assembly
Item 162, Sun gear locks
Item 163, Adapter to fixed column
Item 164, Ring gear
Item 165, Lower planet gear carrier
Item 166, Upper planet gear carrier
Item 167, Planet gear
Item 168, Planet gear locating pin
Item 169, Sun gear
Item 170, Planet gear assembly
Item 171, Planet gear assembly with shell
Item 172, Bearing outer column to fixed column
Item 173, Bearing Inner column to fixed column
Item 174, Main support piston
Item 175, Adapter power column to main piston
Item 176, Counter rotating Servo/Stepper platform
Item 177, Counter rotating Servo/Stepper motor
Item 178, Hydraulic fluid level
Item 179, Slip collar for hydraulic lines to rotating column
Item 180, Basement floor
Item 181, Piston rod
Item 182, Plunger
Item 183, Cylinder assembly
Item 184, Cylinder top
Item 185, Cylinder top, side view
Item 186, Cylinder bottom
Item 187, Cylinder bottom side view
Item 188, Cylinder body
Item 189, Hydraulic line, pump feed
Item 190, Hydraulic line, flywheel fill
Item 191, Hydraulic line, flywheel empty
Item 192, Bearing counter rotating bottom collar, bottom
Item 193, Bearing counter rotating bottom collar, top
Item 194, Adapter ring gear to lower collar
Item 195, Upper rotation gear
Item 196, Lower rotation gear
Item 197, Spider gear
Item 198, Spider gear support shaft
Item 199, Outer support for shaft
Item 200, Inner support for shaft
Item 202, Opening for rotational shaft
Item 203, Adapter from Item 131 to Item 123 power collection column
Item 204, Central column assembly
Item 205, Main support column assembly
Item 206, Flywheel composite shell
Item 207, Flywheel hollow interior
Item 208, Opening for main support for flywheel
Item 209, Starting hydraulic oil level
Item 210, Hydraulic lines to support cylinder
Item 211, Lift/Bearing chamber
Item 212, Lower/Return chamber
Item 213, Hydraulic piston
Item 214, Hydraulic oil fill
Item 215, Hydraulic oil level in tank
Item 216, Curved structure of wings
Item 217, Battery compartment
Item 218, Servo/Stepper motor for wing panels
Item 219, Upper Servo/Stepper motor
Item 220, Lower Servo/Stepper motor
Item 221, Plan view wing
Item 222, Hole in stiffener item 144
Item 223, Electrical connections to servo/stepper motor and power from panels
Item 224, Bearing servo/stepper mounting
Item 225, Slot for the servo/stepper motor Item 134
Item 226, Slot for the connector shaft Item 150
Item 227, Counter rotating Servo/Stepper motor assembly Item 105 top plan view
Item 228, Building floor
Item 229, Gear teeth 150
Item 230, Mounting slot
Item 231, Mounting ring for gears Item 195 and 196
Item 233, Mounting slot
Item 234, Thrust bearing for bottom gear Item 196
Item 235, Lift disk
Item 236, Thrust bearing for lift disk assembly Item 161
Item 237, Lock plunger
Item 238, Thrust bearing lift plunger assembly item 159

DETAILED DESCRIPTION OF THE PREFERRED EMBODIMENT

The basic construction of the combined VAWT/VAST includes a nonrotating portion having an external outer support column and a building like structure, and in this version it is about 250 feet tall, about 300 feet in diameter closed and about 550 feet in diameter with the wings open. The vertical axis turbine is also comprised of a rotating portion which includes centrally located rotating columns with attached arms and panels and other components described herein. This structure is a modified Vertical Axis Wind Turbine (VAWT) designed to maximize wind collection and to supplement that energy collection by the use of solar PV panels; both energy sources which are then stored in a large flywheel with variable mass running at slow speed. The wind collection system in this embodiment is comprised of 10 sets of counter rotation energy collection panels mounted on each collar, and each set has two segments of 4 panels each rotating in opposite directions. Each energy collection panel orientation is controlled by a servo/stepper motor and is made from a series of suitable high efficiency solar PV panels, 15 for each panel in this embodiment.

By making the energy collection panels dual purpose, the VAST has a much higher up time then either wind or solar system alone since if there is no wind the solar PV panels will produce electricity and if there is no sun light the wind will produce electricity. With neither wind or solar, the power comes from spinning down the internal flywheel that acts as an energy buffer. Lastly with the counter rotating panels, the wind kinetic energy can be collected from both sides of the vertical axis significantly increasing energy collection. This VAST is dual sourced using both the kinetic energy of the wind and the photoelectric energy of the sun light so it is designated a Vertical Axis Solar Turbine or VAST to distinguish it from other Vertical Axis designs. Solar is used instead of the W for wind there since the movement of the wind has at its source the Sun and obviously so does the photoelectric energy, so both have the Sun as their source. The VAST is still a turbine so no change in the name there is required.

FIG. 1 is a modified front elevation section view of the VAST showing the major items and the main operating components of the VAST system. Ground level Item 115 if for reference that everything below that line being under-ground and everything above that line being in the open air. The major components are: the basement Item 114; the main building Item 113; the main building roof supports Item 156; the curved transparent roof for the Wind/Solar panels Item 112; the main supports for the roof and the wind collection panels Item 110; the wind collection panels Item 101 and Item 102; the wind diverter panels (Wings) Item 111; a step up gear box or transmission Item 103; the central support column Item 204; a set of counter-rotating collars with Wind/Solar panels Item 104; the main support for the wind collection panels, at rest, Item 105; the energy storage flywheel Item 107; the flywheel support Item 108; a hydraulic cylinder to support the flywheel and Wind/Solar collection panels Item 106; the hydraulic oil reservoir Item 109; and the rotating in either a clockwise or a counter clockwise direction at start up. In practice with the servo/stepper motors Item 134, it is possible to set the panels so that they will only turn in the desired direction as shown by the arrow and once started the system is stable.

FIG. 6 shows the bottom set of counter rotating energy collection panels Item 135. All functions are identical with the upper set except they are controlled by the servo/stepper motors Item 134 to move Item 137 up and Item 136 down (the opposite of the top set Item 131) such that as the rotate they miss each other as they move past one another, each going in the opposite direction of those shown in FIG. 5 and shown here with an arrow going the other way.

FIG. 7 shows the items required to make an upper panel Item 132 or lower panel Item 137. They are identical until mounting to the VAST. These battery backup and buffer electrical storage Item 217. The right side of this drawing shows the staggered assembly method of the Wind/Solar collector collars Item 104.

FIG. 2 shows all the structural components of the VAST. These are all constructed of conventional materials and built by conventional methods. Their purpose is to support the working components of this VAST and they would be sized to fit the actual design for an application which could be larger or smaller than what is shown here. These are: basement Item 114; the main building Item 113; the main building roof supports Item 156; eight support columns, only two are shown here, Item 110; and the transparent roof dome Item 112; and thirteen support and power collector rings Item 116.

FIG. 3 shows a plan view looking down on the VAST with the roof Item 113 removed. In this view we can see three sets of 8 panels, Item 104 each going from top to bottom: the first set Item 127 in position 1; the next set moving down is Item 128 offset by 30 degrees; the third set is Item 129 offset an additional 30 degrees. The sets all rotate around the central column Item 204 (inside item 104 counter rotating collar assemblies). The 30 degree offset can be seen in the elevation view of FIG. 1 on the right side of the VAST. The eight supporting columns are Item 110. Item 116 is the collection ring, one for each layer of 4 panels in a rotation collar Item 104. There is a servo/stepper motor Item 134 on the outer end of each panel assembly Item 131 or Item 135; (opposite each other) that rides inside the collection ring Item 116. FIG. 3 shows the eight wings Item 111 in the open position and FIG. 4 is identical to FIG. 3 but shows the eight wings Item 111 in the closed position, Item 130.

FIG. 5 shows an elevation view at the top and a plan view below it of the top counter rotating energy collection set Item 104 is made from, Item 131 shown here and Item 135 shown in FIG. 6. All the panels in all sets are controlled by servo/stepper motors Item 134. In general, two panels will be up Item 132 and two panels will be down Item 133 at all times as they rotate. With this system it is technically possible to have the counter rotating energy collection panels start assemblies are made using normal production techniques as would be used in any commercial solar PV use. In this embodiment of the VAST, 15 solar panels Item 142 and side view Item 143 are assembled into a frame Item 138 which resembles a series of window frames Item 140. This assembly serves two purposes one to hold the assembly together and two the depth of it as shown in the side view Item 139 creates a series of air dams Item 141 to hold back the wind from sliding off the panels as they rotate around the central column Item 204. Stiffeners Item 146 are added to each panel as required. These stiffeners item 144 side view Item 145 have a hole Item 222 in the large end that a long pipe used to rotate the assembly Item 147 is placed in and secured making a rigid assembly.

FIG. 8 shows an elevation view of one set of counter rotating panels with the counter rotating collars Items 131 and Item 135 separated. The top assembly Item 131 shows the Wind/Solar collector panels Item 132 in the down position on the left and the Wind/Solar collector panel Item 133 on the right in the up position; the solar PV panels Item 142 are shown on both. The servo/stepper motor Item 134 that controls the angle is shown on the end of each panel Item 132 and Item 133. The servo/stepper motor is mounted with the connecting arm Item 150 in the up position on this configuration. The bottom assembly Item 135 shows the Wind/Solar collector panels Item 136 in the down position on the left and the Wind/Solar collector pane Item 137 on the right in the up position. The servo/stepper motor Item 134 that controls the angle is shown on the end of each panel Item 136 and Item 137. The servo/stepper motor is mounted with the connecting arm Item 150 in the down position on this configuration. If Items 131 and 135 are moved together, the assembly will present a solid face to the wind which means that it captures a larger percentage of the kinetic energy in the wind then other designs.

FIG. 9 this view is of one complete pair of counter rotating Wind/Solar panel assemblies Item 104 as shown in FIG. 8. As shown here in their normal operating mode they present a solid face to the wind and any flying animals so the killing of bird's, bats, and insects would be minimized.

FIG. 10 shows the details of the power collector rings Item 116 which are the interface between the Wind/Solar collection panels e.g. Item 131 and Item 135 into the rest of the VAST system. The connections for the Wind/Solar panels e.g. Item 132 are the servo/stepper motors Item 134 and how they are assembled in the support and power collector rings Item 116. This FIG. 10 shows the difference between the upper system Item 131 and the lower system Item 135. The upper system Item 131 is on the right starting with a cross section of the collector ring Item 116 shown as Item 149. The servo/stepper motor Item 134 is placed in the collector ring Item 116 using the bearings Item 224 to hold it in place. The connecting pipe Item 147 on the collector panels Item 132 and 133 is oriented to the top of the collector ring Item 116. While assembling the servo/stepper motor Item 134 into the collector ring Item 116 the servo/stepper motor Item 134 must be oriented as shown in Item 153 and then inserted into the slot Item 225 and the control shaft Item 150 with electrical connector Item 151 must be slid into the mating slot Item 226 in the collecting ring Item 116 shown as Item 149. Once in place there is an electrical connection for the servo/stepper motor assembly Item 134 to the VAST system control through the electrical connection Item 223 making the assembly complete as shown in cross section view Item 155.

the lower panel system Item 135 is on the left starting with a cross section of the collector ring Item 116 shown as Item 148. The servo/stepper motor Item 134 is placed in the collector ring using the bearings Item 224 to hold it in place. The connecting pipe on the collector panes Item 136, Item 137, item 147 is oriented to the bottom of the collector ring Item 116. While assembling the servo/stepper motor Item 134 into the collector ring Item 116 the servo/stepper motor Item 134 must be oriented as shown in Item 152 and inserted into the slot Item 225 and the control shaft Item 150 with electrical connector Item 151 must be slid into the mating slot Item 226 in the collecting ring Item 116 as shown as Item 148. Once in place there is an electrical connection for the servo/stepper motor assembly Item 134 to the VAST system control through the electrical connection Item 223 making the assembly complete as shown in cross section view Item 154.

FIG. 11 shows counter rotating panel assembly Item 131 with the panel attaching shaft Item 147 toward the top and is attached to power collecting column Item 123. Counter-rotating panel assembly Item 135 with the panel attaching shaft Item 147 toward the bottom is attached to counter rotating assembly Item 131. Counter rotating panel assembly 135 sits on the column support assembly Item 105 which is the main support for all the rotating collars and the wind solar collections panels. Item 105 is made from two items, the top pad Item 176 that sits on the base Item 177. The Base Item 177 contains a servo/stepper motor and gearing, not shown, which will rotate the top pad Item 176 and all the structure that is resting on it. This will allow the wind solar collection system to be oriented when required by activating the servo/stepper motor Item 134 from the VAST system controls. Item 105 sits on the fixed support column Item 121 which in turn sits on the Building floor Item 228. Two sets of the column bearings Item 124 are shown in the view.

FIG. 12, shows Item 105 and the two items that make it up the platform Item 176 and the base Item 177. In the plan view Item 227 the rotation directions are shown with the two arrows and it can be moved 360 degrees in either direction. This Item 105 is very similar to a standard commercial index table, just larger.

FIG. 13 shows the counter rotating collar assembly Item 104 attached to a segment of the power collection column Item 123. This assembly is what makes this design work as it allows the wind kinetic energy to be harvested from both sides of the central column Item 204 and all the rotation energy is transferred to the power collection column Item 123 in one rotational direction. Each of the 12 counter-rotating collars Item 104 in the VAST are exactly the same as described here. The top segment of counter rotating collar Item 104 is Item 131 and it is affixed directly to the power collection column Item 123 as shown in FIG. 5 that collar Item 131 has 4 arms attached to it, Item 147 (only two are shown) which then each have two Wind/Solar energy panels attached to them Items, 132 and 133 also not shown here. These four Wind/Solar energy collection panels, when properly oriented by the rotating base Item 105; also not shown here, will transfer the energy from the wind directly to the power collection column Item 123 in the form of torque. The lower rotating collar item 135 is not attached to the rotating column Item 123 but instead is attached to the bottom of bevel gear Item 196. To keep Item 135 stable there are two bearings Item 192 and Item 193 between Item 135 and the power collection column Item 123.

This rotating collar Item 135 also has 4 arms attached to it but unlike the top collar Item 131 these arms are attached at the bottom of Item 135 not the top. The Wind/Solar panels in this Item are set to operate in the opposite direction from those attached to Item 131 such that if a panel is oriented vertically in Item 131 than it will be oriented horizontally in Item 135 as it passes while they are rotating. The servo/stepper motors Item 134 will control this as the collars rotate. Counter rotating panel assembly Item 135 is attached to counter rotating panel assembly Item 131 which, because it is attached to the power collection shaft Item 123, that sets the rotation direction for the VAST system. However, the other collar and the Wind/Solar collection panel assembly Item 135 is also producing torque and is causing the counter rotating panel assembly to rotate as well. The panels on this counter rotating panel assembly Item 135 are programmed to put the spin in the opposite direction from the counter rotating panel assembly Item 131. Since the lower counter rotating panel assembly is attached to the bottom of bevel gear Item 196 with adapter Item 194, it can only turn in one direction because this gear Item 196 is connected to gear Item 195 through four spider gears Item 197 locking the two collars together in an opposite but equal rotation and thereby transferring the torque from the lower counter rotating panel assembly Item 135 to the upper counter rotating panel assembly Item 131 and then to the power collection column Item 123. The spider gears Item 197 are attached to counter rotating panel assembly Item 131 with shaft Item 198 and mounting blocks Item 199 and Item 200. This system has many moving parts but it doubles the energy output of the VAST system.

FIG. 14 shows the detail of the two counter rotating collars Item 131 and Item 135. They could be fabricated from metal or composite material or some combination thereof. They are very similar except for the place where the panel shaft Item 147 attaches as shown as Item 202 where in the top collar Item 131 they are located on the top and in the bottom collar Item 135 they are located on the bottom. The other difference is that Item 135 has two bearings Item 191 and Item 192 placed in the inside. There is a mounting ring Item 194 on the top of Item 135 which is used to attach Item 135 to the bevel gear Item 196 in the upper collar Item 131 locking them together. The inner wall of Item 131 is Item 203 and that is fixed to the power collection column Item 123.

FIG. 15 shows the assembly details of the gears used to transfer the torque to the power collection column Item 123 from each of the counter rotating columns Items 131 and 135. Gears Item 195 and Item 196 are almost identical except for mounting details shown in FIG. 16. Item 195 is attached to the shell of the collar Item 131. Item 196 has a thrust bearing Item 232 between it and Item 230 which is attached to the power collection column Item 123 not shown in this view. The plan view at the top shows the top bevel gear Item 195 and the placement of the four spider gears Item 197 and Item 198 is the shaft holding the spider gear Item 197 Item 199 is the outer block that holds the shaft Item 198 and Item 200 is the inner block that holds the shaft Item 198.

FIG. 16 shows more detail of the main energy transfer gears Items 195 and 196 and both gears are identical with the only difference being the slot for the mounting of the gears; the top gear Item 195 has slot Item 230 and the bottom gear has slot Item 232 machined into them. Both gears have the same number of teeth Item 229 as determined when built. The mounting ring Item 231 is identical and mounted to the power collection column Item 123. Once the mounting rings Item 231 are mounted on the power collection column Item 123 the gears Item 195 and Item 196 can be placed on them and attached. The top gear Item 195 sits on the mounting ring Item 231. The bottom gear Item 196 sits on the thrust bearing Item 233 which sits on the mounting Ring Item 231. This allows the bottom gear Item 196 to turn freely.

FIG. 17 shows the main items needed to take the rotational energy from the wind and move it to the flywheel. This is done in a gear box assembly Item 103 which is used to step up the low speed of the Wind/Solar panel collection column Item 123 with a maximum speed of 15 RPM by a factor of three in the planetary gears Item 170 that transfer the torque through adapter item 160 to the power transfer column Item 122 then to the flywheel Item 107 giving it a maximum speed of 45 RPM. The fixed support column Item 121 is fixed to the building at ground level and does not turn. Items 172 and 173 are bearings holding all the columns Item 121, Items 122, and Item 123 in place.

FIG. 18 is a detailed view of the gearbox Item 103. The basic housing is made from two pieces the top Item 157 and the outer shell Item 158 which is attached to the power collection column Item 123 (not shown here). The ring gear Item 164 of the planetary gear set Item 170 is attached to the side wall the outer shell Item 158. The next item is the planetary gear carrier Item 170 is made up of the lower carrier Item 165, the four planetary gears Item 167, the upper carrier Item 166 and that assembly is attached to Item 163 with pin Item 168 which in turn is attached to the fixed support column Item 121 (not shown in this drawing).

The last major components serve two purposes. The first is to activate the planetary gear system when the hydraulic cylinder Item 106 (Shown in FIG. 17) in the basement Item 114 moves the power transfer column Item 122 up and attached at the top is adapter Item 160 which also then moves up and when that occurs two things happen in the gear box Item 103.

The first thing that happens is that adapter Item 160 is capped by the lift disk assembly Item 161 which is made from two items, Item 235 the base and the thrust bearing Item 236. When assembly Item 161 moves up and the thrust bearing Item 236 touches Item 157 the top of the gear assembly Item 103 lifts the entire gear box Item 103 and the power collection column Item 123 up, which then lifts the power collection column off the base Item 105. That allows the Wind/Solar panels Item 104 to start the rotation of the central column Item 204. The thrust bearing Item 236 allows the Gear box Item 103 to turn at a different RPM than Item 122 the power transfer column.

The second thing that happens is that as Item 160 moves up it engages the sun gear lock assembly Item 159 made from pin Item 237 and thrust bearing Item 238 which then engages the sun gear lock Items 162 which moves out and locks the sun gear Item 169 to the sun gear lock Item 162 and also the adapter Item 160. Item 159 also has a thrust bearing Item 238 on it so that it can turn at the same RPM as the power transfer column Item 122. When the sequence happens the RPM of the outer column is multiplied by a factor of three (with the gearing designed in this design) and that causes Item 160 to rotate at a 3× the RPM of the Gearbox Item 103. Both the power collection column Item 123 and the power transfer column Item 122 are rotating at very low RPM's so a slip clutch was not designed in but maybe required in practice.

FIG. 19 shows the components needed to make the shell for the gear box Item 103 and also the lift mechanism Item 160 and Item 161. The outer shell Is made from three items, the gear box shell Item 158, the gear box top Item 157, and the gear box to the fixed column adapter Item 163. These are all basic fabricated items joined by using conventional methods. The lift mechanism is also made from basic fabricated and machined materials. The lift assembly Item 161 has a thrust bearing Item 236 on top and the lift plunger Item 159 made from Item 237 and thrust bearing Item 238 on top. Both of these thrust bearings are there to allow a differential in RPM of 1 to 3 to exist in this assembly when activated. The sun gear lock Item 162 (4 of them) is used to lock the sun gear Item 169 to the adapter Item 160.

FIG. 20 shows all the pieces required to make the planetary gears for the gear box Item 103. All of these items require machining or gear hobbing on large machines much like the machinery used to make gear boxes for the more common HAWT that are now being made in large numbers worldwide. With a locked (not rotating) planetary gear carrier Item 170 made from the bottom carrier Item 165 the top carrier Item 168 with four pins Item 166 and 4 Item spider gears 167 Item fixed to the fixed support column Item 121 using the adapter Item 163 the VAST systems gear ration is determined by the number of teeth on the sun gear Item 169 and planetary gears Item 167.

There are a number of gear tooth combinations that are possible but since a 1 to 3 ratio was desired it was determined that the best combination that would fit into the allocated space would have a sun gear Item 169 and a planetary gear Item 167 with the same number of teeth, set here at 50 teeth each. The planetary gear set with the carrier locked and with the planetary gears Item 167 and the sun gear Item 169 will have a gear ratio of the ring gear Item 164 tooth count set here at 150 teeth divided by the sun gear tooth count or 150/50 equals 3 in this design. Item 170 is the pitch circle of all the gears and Item 171 is the full teeth engagement of the gear set Item 170.

FIG. 21 shows an overview of the main components of the VAST energy producing system which are the central column Item 204 and the flywheel energy storage system Item 107. Once the wind kinetic energy is collected and converted into rotational energy in the gear box Item 103 it is moved down the central support column Item 204 into the flywheel motor generator system Item 107 where it is either converted directly into electricity or stored in the flywheel Item 107 as angular momentum for use later. The central column Item 204 is held in place by the fixed support column Item 121. Also shown here are the two scatter shields top Item 118 and bottom Item 117 just in case there is a flywheel failure. Item 106 is the hydraulic bearing and lift mechanism, Item 120 contains the field coils and Item 119 is the Armature for the motor generator that is mounted on the tip of the flywheel. The last major items are the hydraulic pump Item 125 and the hydraulic oil reservoir Item 109.

FIG. 22 shows all the components that make up the central column Item 204. The fixed support column Item 121 is what holds the system in place and it must maintain the structural integrity of the entire VAST power transmission system. Inside the fixed support column Item 121 is the power transfer column Item 122 which is centered in the fixed column by the bearing Item 124. On the outside of the fixed support column Item 121 is the power collection column Item 123 which is also held centered to the fixed column with another set of bearings Item 124. The power collection column Item 123 sits on the base Item 105 and the power transfer column Item 122 sits on the hydraulic bearing Item 106.

FIG. 23 shows a more detailed view of the central column Item 204 the center section has been cut out to be able to show the detail. In this view the gear box Item 103 has been added to the top of the central support column Item 204. Item 105 the column support can be seen here as well as a better view of the column bearings Item 124. The last Item 106 is the lower column support assembly that transfers the torque to the Flywheel Item 107 not shown here.

FIG. 24 is made from view FIG. 21 with the central column Item 204 and the gear box 203 and adding back the building Item 113, the basement Item 114, and the hydraulic oil supply Item 109 the so the lower portion of the VAST system can be put back together. The next several Figures will be showing how the Flywheel Item 107 and the hydraulic support system Item 106 work.

FIG. 25 is moving in closer for more detail so we take FIG. 24 chop off the top of the support column assembly Item 204 and we cut off the left side of the basement Item 114 allowing us to see more flywheel Item 107 detail. First we have the scatter shields Item 117 and Item 118 then the hydraulic system pump Item 125. In the hydraulic oil holding tank Item 109 we have the fluid level Item 215 and the fill opening Item 214. In this view we can see the starting hydraulic oil level Item 209 in the bottom of the Flywheel Item 107. We can also see the tow motor generator components the Field Item 120 and the armature Item 119.

FIG. 26 shows the basic flywheel Item 107 in the top elevation view and in the bottom plan view. This Item is made in a very different manner than any other flywheel system. First it is very large with a diameter of 234.75 feet and 16.25 feet high in the middle with a hole in the middle Item 208 10 feet in diameter; it mounts to a shaft that is also 10 feet in diameter Item 181 (not shown here) and which is the central axis for the flywheel. This VAST flywheel shell Item 206 was designed using Carbon Fiber which has a tensile of 5,650,000,000 Pascal's and with a density of 1750 kg/m3 and it has a hollow core Item 207. Other materials are available such as Spectra 2000 and T-700 if required, for design reasons. Second, on the outer edge or rim which is 5.0 feet thick, in this configuration, the flywheel Item 107 has built into it the makings of a motor armature Item 119. This item is both a flywheel and a motor generator armature. When an actual flywheel is made using this design there will be interior baffles and supports required which are not shown here.

FIG. 27 and also FIG. 28 show the basic hydraulic oil flows to the pump Item 125; from the tank Item 109; through line Item 189; then from the hydraulic pump Item 125; to the flywheel Item 107. There are two sets of lines from the pump Item 125; the first set is Item 210 and the second set is Item 126. The lines labeled Item 210 go to the bottom of the main support assembly Item 106; where they are used to feed into the cylinder high pressure hydraulic oil to raise Item 211 or lower Item 212. When hydraulic oil is pumped into the lower chamber Item 211, the piston Item 174 and Item 213 moves up which in turn raises Item 108 and that engages the gear box Item 103 and that allows the 12 Wind/Solar panel assemblies Item 104 to start rotating and generating power. When the flywheel Item 107 is turning, the rim armature Item 119 interacts with the field coils Item 120 and electricity is produced. At this point all the power can be sent to the grid or some of it can be used to run up the Flywheel Item 107 RPM storing energy.

The other set of hydraulic lines Item 126 serve a much different purpose. The flywheel item 107 is hollow and in this VAST system there is a method used here to fill Item 192 or empty Item 191 that hollow space Item 207 in the flywheel Item 107 with hydraulic fluid. Hydraulic oil has a density about 88% of water at 880 kg/m3 so by pumping in hydraulic fluid or pumping it out the mass of the flywheel Item 107 can be significantly changed. Empty the flywheel Item 107 would be about 2,000 tons and full about 21,000 tons. Although in normal flywheels systems speed is more important than mass; in this application the mass is easier to deal with than super high RPMs so that is what is used in the VAST system.

Commercial hydraulic pumps, hoses and valves are commonly rated at 3,000 PSI so as designed in this configuration; the hydraulic support column is capable of supporting over 50,000 Tons. This is well over the combined weight of the flywheel, Item 107 and all the supporting structures above it. Rough calculations indicate that the VAST system would be operating with weights requiring more like 2,000 pounds per square inch, well under what is used in commercial industrial systems. At full weight 20,951 tons and spinning at 45 RPM the flywheel would contain 37,489 kWh of power. To get to that level the flywheel Item 107 would first be taken up to speed 45 RPM and then hydraulic fluid would be added to increase mass. The Wind/Solar panels should be capable of 10 mw of power from wind and up to 2 mW of power from solar giving a total system capability of about 12 mW of power in daylight with a wind of 25 mph. This calculation was done based on US latitudes for sunlight.

FIG. 28 is an extension of FIG. 27 to show additional detail starting with the interface between hydraulic lines set 126 and the flywheel Item 107. Both sets of lines go through a slip collar Item 179 then through the adapter Item 178 where they then enter the flywheel Item 107 as shown in FIG. 27. Also shown here is the hydraulic fluid level in the flywheel at start Item 178. Surrounding the flywheel Item 107 are scatter shields Item 117 on the bottom and Item 118 on the top to protect people and system from a flywheel Item 107 failure. Additional protection comes from the building floor Item 228 and the basement floor Item 180. Lastly we have the fixed support column Item 121, the column support assembly Item 105, the power collection column Item 123, and the power transfer column Item 122.

not shown in any of the drawings here are the control wiring, electrical power lines and computer systems required to run all the components of the VAST system. They are not shown as there would be nothing special about them as they would be the same as what would be used to build a piece of automation equipment for industry.

FIG. 29 shows the makeup of the main support assembly Item 106. Ten items make up this assembly starting with: the cylinder body Item 188; than adding the piston rod Item 181; the plunger Item 182, the top Item 184 plan view, the cylinder top Item 184 plan view; the cylinder bottom Item 187 plan view; thereby making the assembly Item 183. On top of the piston rod Item 181, the adapter Item 175 is placed along with the hydraulic lines Items 191 and 192 that are fed into the main support assembly through a slip collar Item 179. Although lines are shown inside the piston rod they would actually be drilled holes. The fitting required to assemble the hydraulic control system are standard high pressure hydraulic fittings and are not shown here.

FIG. 30 is a representation of the wind diverter or wing Item 111 which is 205 feet tall and almost 125 feet wide. There are eight of the wings Item 111 on the VAST in this embodiment and they are used to control air flow into the VAST and then also be able to be closed to protect the interior in bad weather. There are two servo/stepper motors Items 219 and Item 220 on the wing Item 111. A plan view of the wing Item 221 shows the curve Item 216 built into the wing Item 111 so it can close over the round VAST structure. The plan view of Item 221 also shows the plan view of the servo/stepper motor Item 219. This wing Item 111 could also be made transparent to allow sunlight in and yet keep the panels closed.

FIG. 31 represents the basic air flow through the VAST system. With appropriate software it may be possible to optimize the size and shape of these wings Item 111. These wings Item 111 are shown here as only being representative of the concept.

FIG. 32 is a simple diagram of the energy flows in the VAST which starts with the sun. The sun's energy reaches us mostly in visible and infrared radiation which can be collected through photoelectric panels and by devices that can harness wind energy which is created from the heating of the earth's atmosphere by the sun. In the VAST both forms of energy are collected. Light is collected in the photoelectric cells on the wind collection panels Item 142, which are low voltage DC. This low voltage DC moves to the electronic power converter system which charges a lithium ion battery pack Item 217 of say 20 kW capacity as standby back up power source as the system needs power to start up. The rest of the energy is converted to high voltage AC and connected to the grid along with that collected from the wind side of the system.

The wind energy in the form of kinetic energy forces the system panels to rotate, one set clockwise Item 101 and the other set counter clockwise Item 102 with all the energy transmitted to the power collection column Item 123. From there it goes to a gear box Item 103 which speeds up the RPM and then moved down to a flywheel Item 107 to be stored as angular momentum. The flywheel is also a motor generator (M/G set) and so the wind energy now in the form of angular momentum can be used to maintain the flywheel Item 107 speed or moved though the power conditioning system to be sent to the grid.

The software required to run this system is no different from what would be required to run a large automated piece of industrial equipment used to make parts of assemblies. One of the things that this kind of control gives is that if the wind isn't blowing fast enough to speed up the flywheel, the central column Item 204 can be shut off by reducing the pressure in the lower chamber Item 211 of the main support Item 106 allowing the power collection column Item 123 to set down on the support column Item 105 and that disengages the gear box Item 103. At that point the column support assembly Item 105 can rotate the Wind/Solar panels in all the layers to face the Sun maximizing the solar PV output. That energy can be used to speed up the flywheel through the M/D set or supply the Grid depending on conditions. This feature gives the ability to generate power during the day even when there is low speed wind or no winds.

the VAST system will require an industrial grade computer and software such as provided by Allen Bradley to run the system, the servo/stepper motors, sensors, limit switches and related equipment. The system would be run by a ladder logic style program. The control program has not been written as it would be very specific to the actual components used to build the system.

FIG. 33 shows a prospective view of the VAST system as described in this patent application. This image was created as a rendering in SketchUp not a 3D CAD program to show the look of the finished VAST design. It does accurately capture what would be seen if this VAST was actually built. All the exterior panels and roof are shown here as being transparent to allow sunlight into the Solar PV panels and not have them in shade from the structure.

FIG. 34 shows a prospective view of the VAST system as described in this patent application with a section cut through the center so the insides can be seen. The main items are: the transparent roof Item 112; the support columns Item 110; The transparent wings Item 111; the building item 113; the flywheel Item 107; the basement Item 114; the wind/Solar panels Item 101; and Item 102; the counter rotating Wind/Solar panel assembly Item 104; the central column Item 204; and the gear box Item 103. Ground level Item 115 is shown for reference.

OTHER EMBODIMENTS

FIG. 13 shows a cross section view of the counter-rotating collars Item 104 which mounts to the central support assembly Item 204 which is made from three items, being the fixed support column Item 121, the power transfer column Item 122, and the power collection column Item 123. Because of the scale of this invention it might be easier to section Items 121, 122, and 123; and combine them with the counter-rotating collar assembly Item 104 into a universal assembly. The columns item 121, Item 122, and Item 123; would than need mounting flanges welded or affixed to them where they were cut (so to speak) such that the resulting modules could be stacked as high as was required for the particular application. If this were done the first step in assembly would be to mount the new column assembly to the one below it and then drop the collar assembly over it; then repeat the process to the required number of collar sets or height. Other items in this design would also need to be modified.

FIG. 18 shows the detail for the gear box Item 103. In that Figure a method of engaging the gear box by connecting Item 157 and Item 161 together and it was described as a strictly mechanical means of engagement, a clutch of sorts. This mechanism could be replaced by a torque converter such as found on heavy duty trucks and off road equipment. This addition would be simple to do if it was found to be needed FIGS. 27 & 28 shows the detail of Item 106 the hydraulic lift and bearing assembly. In this embodiment when hydraulic pressure is added to the bottom chamber Item 211, the piston Item 213 will move up to engage the gear box clutch mechanism in the gear box Item 103. This motion will also raise the Flywheel assembly Item 107 which is attached to the piston rod Item 181. In lieu of this the Flywheel Item 107 and the piston rod Item 181 could be made with a mating spline on each that would allow the piston Item 181 to move up without moving the flywheel Item 107 up. There would need to be bearings or bushings added to prevent the movement of the flywheel but these would fit in this existing design with very little modification.

There are a large number of places where servo/stepper motors are used to control motion in this VAST. Almost of these functions could be done with various combinations of gears, cams, pulleys and levers. Although these designs would work, their use would unduly complicate the design. Servo/stepper motors have all but limited gears, cams pulleys and levers in commercial and industrial automation and there does not appear to be a good reason to use them here.

This design will also work with replacing the flywheel system with a conventional generator which could be placed in the basement space and be connected with a right angle gear drive. To balance loading two generators directly opposite each other would be the first thought or method and following this logic, three generators 120 degrees apart would be even better. This would also give redundancy to the system The flywheel assembly used in this VAST would be spinning at up to 45 RPM which would then have a speed on the rim of 380 MPH so running the system in air could pose an issue at that speed. To alleviate that issue the flywheel could be run in a vacuum which would increase the efficiency; this is not shown here but would probably be used in practice.

Because of the very complex air flows though the VAST it may be required to place baffles, horizontal to the ground, between all the various rotating segments to properly direct the air flow though the system. This would be determined at the time a VAST was actually designed and an Finite Element Analysis (FEA) analysis could be performed on the VAST. This addition would require 11 baffles if used.

NON-LIMITING EXAMPLES

The present VAST concept has been described in relative terms of scale, size and of the shape of the various components and assemblies and this was necessary in order to make drawings to show how the VAST could be made. Other components and assemblies of different shapes and sizes that perform the same functions are therefore considered to be within the scope and embodied shown in this present method of building a VAST as described herein. The scope of the VAST concept shown here is not to be restricted, therefore, to the specific embodiments, and it is intended that the appended claims cover any and all such applications, modifications and embodiments within the overall scope of the present invention.

What is claimed is:
1. A vertical wind turbine comprising,
a nonrotating portion including an outer support column, a dome, a building, and a hydraulic pump, an interior nonrotating support column, a series of rings, said rings being supported by said outer support column, field coils, a battery,
a rotating portion, said rotating portion comprising,
a plurality of counter rotating collar assemblies, said counter rotating collar assemblies configured to rotate about a common axis, with each counter rotating collar assembly comprised of an upper collar assembly and a lower collar assembly with each collar assembly having arms, said arms further having panels,
a power collecting column,
a plurality of gear sets wherein each of the counter rotating collar assemblies has a gear set configured to additively combine the torque from said lower collar assembly with the torque from said upper collar assembly, thereby directing the combined torque to power rotation of said power collecting column,
a power collecting column support means,
means to orient said panels wherein said counter rotating collars are urged to rotate in opposite directions,
means to direct torque from said power collecting column to a flywheel,
a hydraulic flywheel support means,
an armature, said armature positioned on the rim of said flywheel to electromagnetically interact with said field coils thereby generating electricity, said armature and said field coils thereby comprising a motor generator,
a power conditioning unit, said power conditioning unit configured to control the flow of electricity within and flowing out of the wind turbine.
2. The vertical wind turbine of claim 1 further comprising, photovoltaic cells, said photovoltaic cells arranged on said panels to convert incident solar irradiation to electricity,
means to direct electricity from said photovoltaic cells to said series of rings whereby said photovoltaic cells, said servo/stepper motors, said series of rings, the motor generator and said power conditioning unit are controllably electrically connected either directly or indirectly.
3. The vertical wind turbine of claim 2 further comprising,
a plurality of wings, said wings pivotably attached to the exterior of said outer support column, with said wings configured to divert wind to the rotating portion of the turbine when in an open configuration,
a means for using said wings to act as throttles to control the wind flow into the collection panels.
4. The vertical wind turbine of claim 2 further comprising, wherein said panels are comprised of solar photovoltaic panels.
5. The vertical wind turbine of claim 3 further comprising, electrical and control wiring, a computer system to control the servo/stepper motors, hydraulic pump and other electrically driven components of the wind turbine.
6. The vertical wind turbine of claim 5 further comprising, power collector support rings, with each power collector support ring having a slot, each of said power support rings each further having an electrical connection, said servo/stepper motors each having a connector with each connector having power and signal connective rings on the exterior of said connector, said power support rings and each of said servo/stepper motors being configured wherein each respective connector can be fitted into said slot thereby establishing electrical power and signal connections to and from said servo/stepper.
7. The vertical wind turbine of claim 4 further comprising, an arrangement wherein said power conditioning unit, is electrically connected to said battery, the motor generator, said power collector support rings, and to an external grid.
8. A vertical wind turbine comprising,
a nonrotating portion including an outer support column, a dome, a building, and a hydraulic pump, an interior nonrotating support column, field coils, a battery,
a vertical rotating portion, said rotating portion comprising,
a power collecting column,
a power transfer column, said power transfer column and said power collecting column being arranged concentrically and having said nonrotating support column positioned between the power transfer column and the power collecting column,
a plurality of counter rotating collar assemblies, said counter rotating collar assemblies configured to rotate about a common axis, with each counter rotating collar assembly comprised of an upper collar assembly and a lower collar assembly, and with each upper collar assembly comprised of a cylindrical upper collar body, each upper collar body positioned around and fixedly attached to said power collecting column and each upper collar body having attached arms which extend radially, the arms having attached panels configured to capture wind energy thereby applying rotational force to said upper collar, each lower column assembly comprised of a cylindrical lower collar body, each lower collar body positioned below its respective upper collar body and further positioned around said power collecting column and each lower collar body having attached arms which extend radially, the arms having attached panels configured to capture wind energy thereby applying rotational force to said lower collar, each of the of said upper collar assemblies and said lower collar assemblies having a servo/stepper motor positioned at its outer end, each servo/stepper motor being electrically connected to a power source, said servo/stepper motors configured to control the orientation of the surfaces of the panels such that the panels of the upper collar assembly do not collide with the panels of the lower collar assembly and to determine the direction of rotation of each collar assembly such that said upper collar assemblies wherein said lower collar assemblies are urged in opposite directions, gear sets, each gear set comprised of a beveled upper rotation gear, a beveled lower rotation gear and spider gears, wherein each spider gear engages both the upper rotation gear and the lower rotation gear in the gear set wherein the upper rotation gear and lower rotation gear are constrained to rotate with their angular velocities being opposite and equal, an arrangement wherein each upper rotation gear is attached to its respective upper collar and each lower rotation gear is attached to its respective lower collar, a gearbox, said gearbox having a housing comprised of a top and an outer shell, said outer shell being attached to the top of said power collecting column, said gearbox having a sun gear, ring gear and planetary gears disposed therein, said ring gear fixedly attached to the inside surface of the outer shell, an adapter, said adapter positioned at the top of the power transfer column with said adapter extending into said gearbox, said sun gear fixedly attached at the top of said adapter, said ring gear and said planetary gears arranged so that rotation of the power collecting column turns the power transfer column, with said planetary gears rotatably attached to the top of said nonrotating support column, and with said planetary gears meshed with said ring gear and with said sun gear, said sun gear, said ring gear, and said planetary gears configured such that the power rotation column rotates with greater rotational speed than the power collecting column, a flywheel, an armature, said armature positioned on the rim of said flywheel to electromagnetically interact with said field cons thereby generating electricity, said armature and said field cons thereby comprising a motor generator, a hydraulic flywheel supporting mechanism, said hydraulic flywheel supporting mechanism configured to position and support said flywheel, a power conditioning unit, said power conditioning unit configured to control the flow of electricity within and flowing out of the wind turbine.

9. A method for combining solar energy and wind energy in a vertical axis wind/solar turbine comprising, diverting the wind into a nonrotating portion of the vertical axis wind/solar turbine and to force the wind to push on a series of panels made up of solar PV panels, said solar PV panels comprising part of a rotating portion of the vertical axis wind/solar turbine, said rotating portion further comprised of a gear sets and a power collecting column, said panels push clockwise on one side and counter clockwise on the other side of the power collecting column and the forces are combined by said gear sets that makes all the energy run in the same direction either clockwise or counter clockwise, wherein when the wind energy is being moved to said power collecting column as angular momentum, the solar energy from the solar PV panels in the form of electricity is moving away from the power collecting column and picked up in a series of rings that surround the rotating portion, moving the solar energy by further conducting the solar-derived electricity, in the form of low voltage DC down the ring support structure into a power conditioner, stepping up the angular momentum from a low RPM to a higher RPM with a gear box wherein the angular momentum is transferred to the flywheel, generating electricity with a motor generator system, said motor generator system comprised of a motor armature and field coils, with said motor armature attached to the rim of said flywheel, said motor armature further positioned next to field coils, said motor armature and said field coils comprising said motor generator system, said field coils being attached to the building structure, wherein when the flywheel reaches an operating RPM the excess angular momentum is converted to electrical energy in the motor generator system and directed to the power conditioner, using the power generated from both, the wind and solar PV panels to keep the flywheel at operating RPM and/or charging a battery and/or feed power into an electrical grid.

* * * * *